(12) United States Patent
Nakajima et al.

(10) Patent No.: US 9,391,443 B2
(45) Date of Patent: Jul. 12, 2016

(54) POWER SUPPLY APPARATUS AND IMAGE FORMING APPARATUS

(71) Applicant: CANON KABUSHIKI KAISHA, Tokyo (JP)

(72) Inventors: Nozomu Nakajima, Kawasaki (JP); Takao Kawazu, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/848,562

(22) Filed: Sep. 9, 2015

(65) Prior Publication Data
US 2015/0380927 A1 Dec. 31, 2015

Related U.S. Application Data

(63) Continuation of application No. 14/148,478, filed on Jan. 6, 2014, now Pat. No. 9,171,241.

(30) Foreign Application Priority Data

Jan. 17, 2013 (JP) ................................ 2013-006421

(51) Int. Cl.
G03G 15/00 (2006.01)
H02H 3/20 (2006.01)
G06K 15/00 (2006.01)

(52) U.S. Cl.
CPC ............. *H02H 3/20* (2013.01); *G03G 15/5004* (2013.01); *G03G 15/80* (2013.01); *G06K 15/4055* (2013.01)

(58) Field of Classification Search
CPC .................................. H02H 3/20; G03G 15/80
See application file for complete search history.

(56) References Cited

U.S. PATENT DOCUMENTS

| 3,374,398 A * | 3/1968 | Horn ........................ H02H 3/08 |
| | | 361/100 |
| 4,788,618 A | 11/1988 | Kimura |
| 4,999,730 A | 3/1991 | Pickard |
| 8,134,820 B1 | 3/2012 | Riccio et al. |
| 2005/0259373 A1 | 11/2005 | Hoopes |
| 2006/0146464 A1 | 7/2006 | Tan et al. |

(Continued)

FOREIGN PATENT DOCUMENTS

| JP | 2009-219316 A | 9/2009 |
| JP | 2009-284561 A | 12/2009 |
| JP | 4612855 B2 | 1/2011 |

OTHER PUBLICATIONS

U.S. Appl. No. 14/188,508 filed by Minoru Hayasaki et al., on Feb. 24, 2014.

*Primary Examiner* — G. M. Hyder
(74) *Attorney, Agent, or Firm* — Fitzpatrick, Cella, Harper & Scinto

(57) ABSTRACT

The power supply apparatus includes a first power supply unit for outputting a first voltage; a second power supply unit for outputting a second voltage different from the first voltage; a switch unit operating with the first voltage, which is disposed in a power supply path connecting to the second power supply unit, for supplying and shutting down power to the second power supply unit; a detection unit for detecting that a predetermined voltage or higher is supplied to the first power supply unit; and a control unit for controlling the switch unit to stop the output of the first voltage from the first power supply unit, when the detection unit detects that the predetermined voltage or higher is supplied to the first power supply unit.

18 Claims, 11 Drawing Sheets

(56) References Cited

U.S. PATENT DOCUMENTS

| | | |
|---|---|---|
| 2006/0282703 A1 | 12/2006 | Nam |
| 2011/0280597 A1 | 11/2011 | Shimura et al. |
| 2012/0092907 A1 | 4/2012 | Hsu |
| 2012/0155910 A1 | 6/2012 | Sato |
| 2012/0218670 A1 | 8/2012 | Han |
| 2013/0113292 A1 | 5/2013 | Inukai |
| 2013/0129367 A1* | 5/2013 | Jeong ................ H02M 3/33507 399/37 |
| 2013/0188979 A1* | 7/2013 | Okada .................... H02J 9/005 399/88 |
| 2013/0195479 A1* | 8/2013 | Tsujihara ........... G03G 15/2007 399/33 |
| 2014/0254210 A1 | 9/2014 | Hayasaki et al. |

* cited by examiner

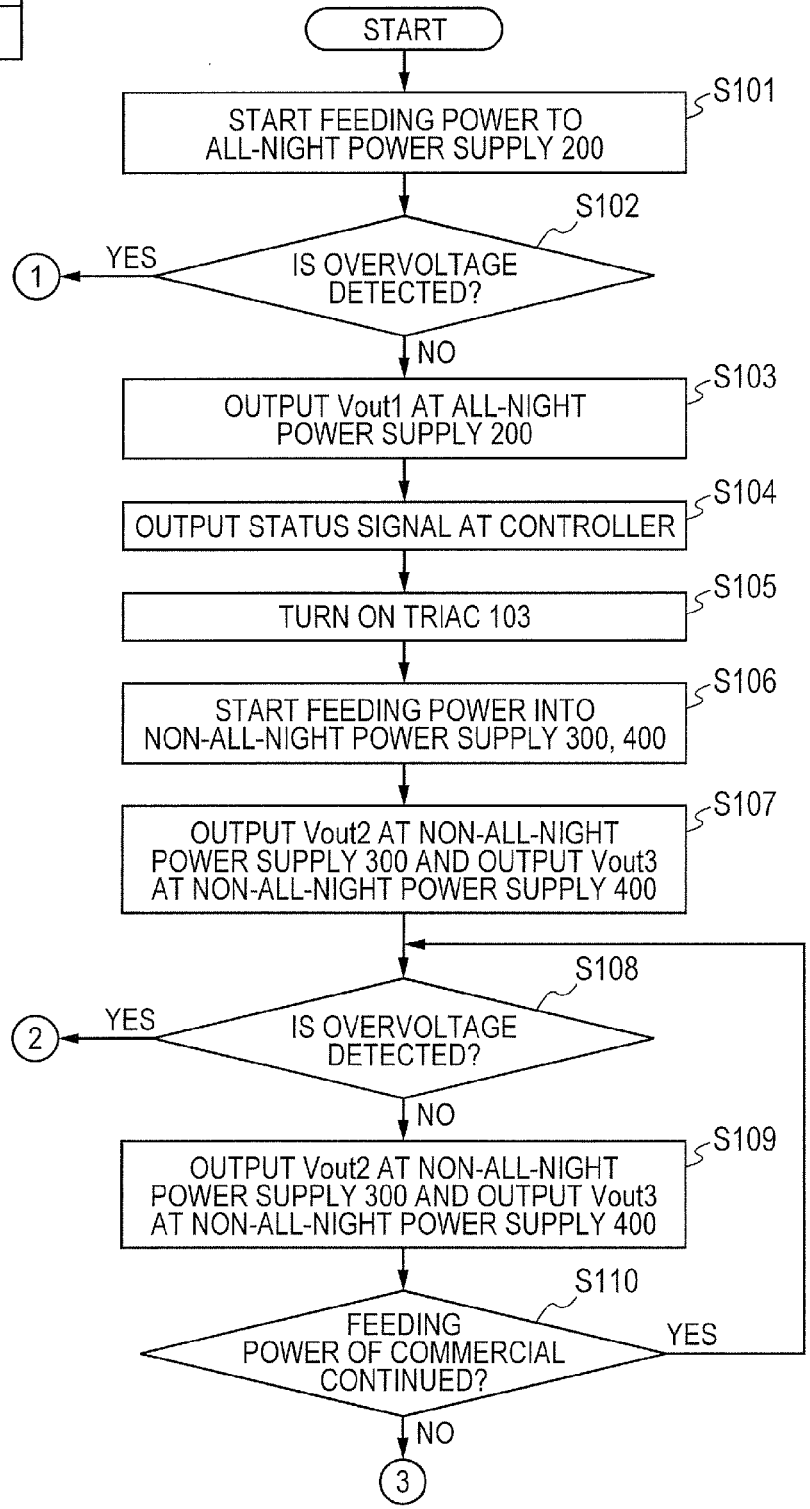

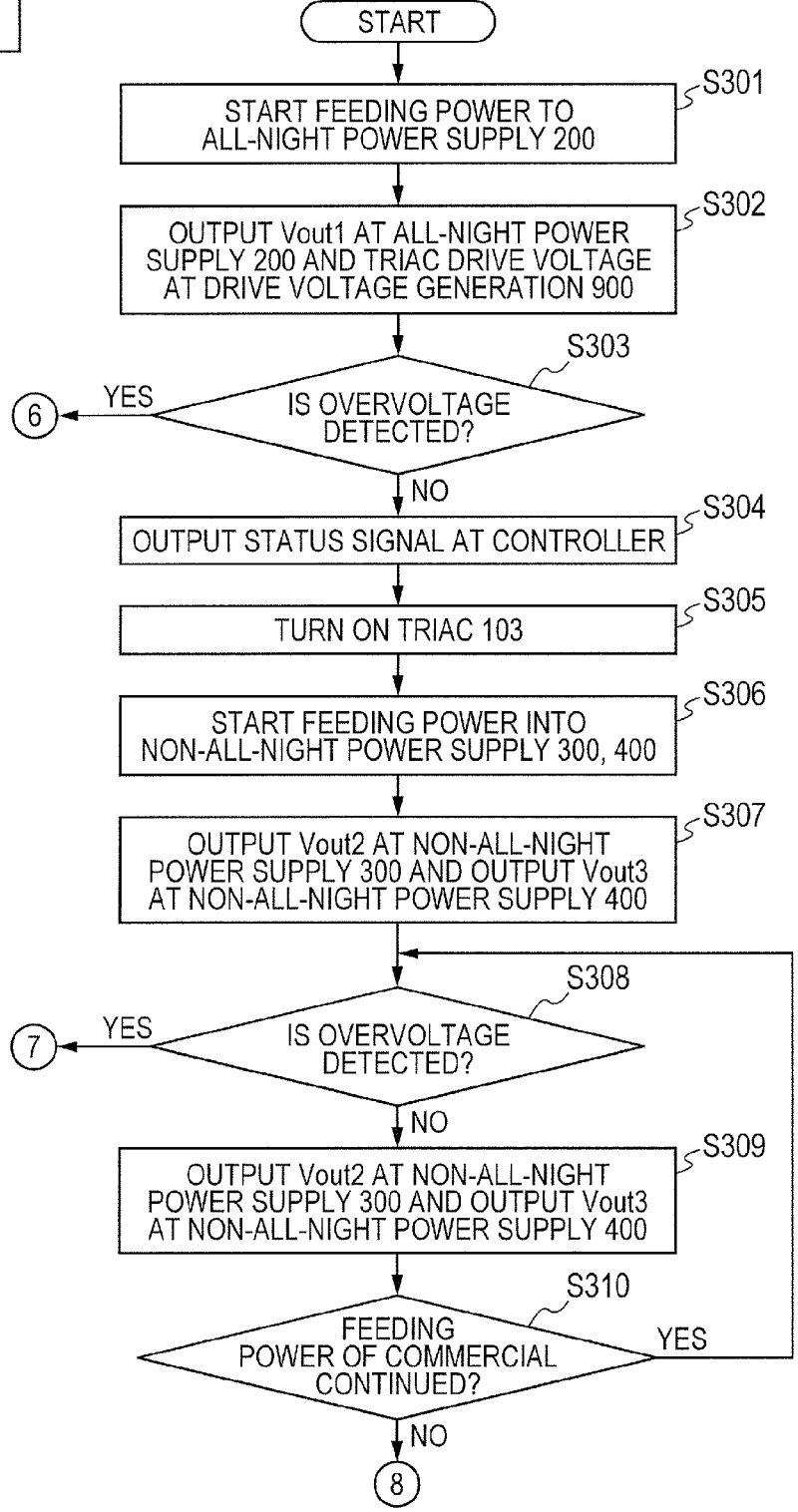

POWER SUPPLY APPARATUS AND IMAGE FORMING APPARATUS

This application is a continuation of U.S. patent application Ser. No. 14/148,478 filed Jan. 6, 2014, the contents of which are incorporated herein by reference.

BACKGROUND OF THE INVENTION

1. Field of the Invention

The present invention relates to a power supply apparatus whose input source is a commercial AC power source, and an image forming apparatus including the power supply apparatus.

2. Description of the Related Art

There are widely used power supply apparatus, which are to be mounted in various electronic equipment, and are supplied with power from a commercial AC power source so as to output necessary DC voltages to be used in the electronic equipment. As those power supply apparatus, there are known apparatus equipped with a switching converter unit. In the power supply apparatus equipped with a switching converter unit, a rectifying and smoothing circuit is disposed downstream of a commercial AC power source input unit so as to generate a DC voltage. Then, the switching converter unit (DC-DC converter unit) chops the DC voltage by on-off operation of a switching element and then smoothes the chopped voltage so as to ultimately output a stable necessary DC voltage.

Hitherto, electronic equipment such as a copier and a printer usually uses a dedicated power supply apparatus whose input voltage is an AC 100 V system (for example, AC 100 V to 120 V) for Japan and North America, or an AC 200 V system (for example, AC 220 V to 240 V) for Europe. In general, an aluminum electrolytic capacitor is often used in a rectifying and smoothing unit of this dedicated power supply apparatus. In many cases, as the aluminum electrolytic capacitor, an optimal component is selected for each region of the AC 100 V system or AC 200 V system. For instance, a capacitor having a withstanding voltage of 200 Vdc is used for the power supply apparatus of the AC 100 V system, and a capacitor having a withstanding voltage of 400 Vdc is used for the power supply apparatus of the AC 200 V system.

When a voltage equal to or higher than the withstanding voltage is applied to the aluminum electrolytic capacitor, the internal pressure increases because leakage current increases. Then finally, an explosion-proof valve (hereinafter simply referred to as "value") acts so that high pressure gas containing the electrolyte bursts out. This phenomenon is called "valve-open". Because the electrolyte used in the aluminum electrolytic capacitor has conductivity, the electrolyte burst from the aluminum electrolytic capacitor may cause a short circuit between components or between circuit patterns, resulting in a circuit malfunction.

The power supply apparatus needs to be protected from break-down even when a voltage equal to or higher than the withstanding voltage of the aluminum electrolytic capacitor is supplied from the commercial AC power source. For this reason, it is desired not to cause the valve-open of the aluminum electrolytic capacitor. Hitherto, there are proposed means for protecting the power supply apparatus from application of an overvoltage from the commercial AC power source. For instance, Japanese Patent Application Laid-Open No. 2009-219316 and Japanese Patent Application Laid-Open No. 2009-284561 propose protecting means for turning off a switching element (such as a relay or a triac) when the detected voltage is a predetermined value or higher by using an input voltage monitoring unit for monitoring the input voltage disposed in the switching converter unit. In addition, Japanese Patent No. 4612855 proposes means for detecting a voltage applied to the aluminum electrolytic capacitor for smoothing the input voltage and supplying an excessive current to a circuit so as to blow out a fuse of an input portion when the detected voltage is a predetermined value or higher.

Electric power environment is usually poor in developing countries compared with developed countries. As a result, an overvoltage is often applied to the electronic equipment in developing countries. Therefore, it is desired to adopt a resettable protection unit which can protect the electronic equipment against application of an overvoltage and can return to a power suppliable state when the overvoltage state is canceled so that the overvoltage protection is released. In addition, requirements for saving energy in electronic equipment are increasing day by day, and it is required to achieve both the resettable protection against application of an overvoltage and the energy saving.

However, the related art techniques described above has a problem that it is possible to achieve one of the resettable protection against application of an overvoltage and the energy saving, but it is difficult to achieve both of them. For instance, the power supply apparatus described in Japanese Patent Application Laid-Open No. 2009-219316 and Japanese Patent Application Laid-Open No. 2009-284561 have a resettable protection unit against application of an overvoltage. However, because an overvoltage protection circuit is mounted, power consumption for turning on the switching element and power consumption in the input voltage monitoring unit are necessary, and hence standby power consumption (in a sleep mode or the like) is increased. Therefore, in a standby mode, the power consumption for turning on the switching element and the power consumption in the input voltage monitoring unit become larger relatively to power consumption of the entire electronic equipment and cannot be neglected for achieving energy saving. In addition, because the protection unit disclosed in Japanese Patent No. 4612855 blows out the fuse when an overvoltage is applied, the equipment cannot be returned to the original state when the overvoltage state is canceled.

SUMMARY OF THE INVENTION

The purpose of the present invention is aimed at achieving a resettable protection in which overvoltage protection is activated when an abnormality of an input voltage is detected and afterward returns to its original state, and reducing power consumption in a standby mode.

The purpose of the present invention is to provide a power supply apparatus, including a first power supply unit to which a power is supplied from an AC power source, for outputting a first voltage, a second power supply unit to which a power is supplied from an AC power source, for outputting a second voltage different from the first voltage, a switch unit which operates with the first voltage from the first power supply unit, and is disposed in a power supply path from the AC power source to the second power supply unit so as to perform power supply and cut-off of the power to the second power supply unit, a detection unit for detecting that a predetermined voltage or higher is supplied from the AC power source to the first power supply unit, and a control unit for controlling the switch unit to stop the output of the first voltage from the first power supply unit so as to cut off the power supply to the second power supply unit, when the detection unit detects that the predetermined voltage or higher is supplied to the first power supply unit.

The purpose of the present invention is to provide a power A power supply apparatus, including a first power supply unit to which a power is supplied from an AC power source, for outputting a first voltage, a second power supply unit to which a power is supplied from an AC power source, for outputting a second voltage different from the first voltage, a switch unit which operates with the first voltage from the first power supply unit, and is disposed in a power supply path from the AC power source to the second power supply unit, so as to perform power supply and cut-off of the power to the second power supply unit, a detection unit for detecting that a predetermined voltage or higher is supplied from the AC power source to the second power supply unit, and a control unit for controlling the switch unit to stop the output of the first voltage from the first power supply unit and the output of the second voltage from the second power supply unit so as to cut off the power supply to the second power supply unit, when the detection unit detects that the predetermined voltage or higher is supplied to the second power supply unit.

The purpose of the present invention is to provide an image forming apparatus, including an image forming unit for forming an image on a sheet, and a power supply for supplying power for operating the image forming apparatus, the power supply including a first power supply unit supplied with power from an AC power source so as to output a first voltage, a second power supply unit supplied with power from the AC power source so as to output a second voltage different from the first voltage, a switch unit which operates with the first voltage from the first power supply unit, and is disposed in a power supply path from the AC power source to the second power supply unit, so as to perform power supply and cut-off of the power to the second power supply unit, a detection unit for detecting that a predetermined voltage or higher is supplied from the AC power source to the first power supply unit, and a control unit for controlling the switch unit to stop the output of the first voltage from the first power supply unit so as to cut off the power supply to the second power supply unit, when the detection unit detects that the predetermined voltage or higher is supplied to the first power supply unit.

The purpose of the present invention is to provide an image forming apparatus, including an image forming unit for forming an image on a sheet; and a power supply for supplying power for operating the image forming apparatus, the power supply comprising a first power supply unit supplied with power from an AC power source so as to output a first voltage, a second power supply unit supplied with power from the AC power source so as to output a second voltage different from the first voltage, a switch unit which operates with the first voltage from the first power supply unit, and is disposed in a power supply path from the AC power source to the second power supply unit, so as to perform power supply and cut-off of the power to the second power supply unit, a detection unit for detecting that a predetermined voltage or higher is supplied from the AC power source to the second power supply unit; and a control unit for controlling the switch unit to stop the output of the first voltage from the first power supply unit and the output of the second voltage from the second power supply unit, to thereby cut off the power supply to the second power supply unit, when the detection unit detects that the predetermined voltage or higher is supplied to the second power supply unit.

Further features of the present invention will become apparent from the following description of exemplary embodiments with reference to the attached drawings.

DESCRIPTION OF THE EMBODIMENTS

Now, exemplary embodiments of the present invention are described in detail.

A first embodiment of the present invention is described below.

In the first embodiment, there is described a method of monitoring a voltage across the terminals of a capacitor for smoothing an input voltage of a non-all-night power supply to be protected when an input voltage from a commercial AC power source is an overvoltage, at a position upstream of a switching element (viewed from the commercial AC power source side).

Structure of Power Supply Apparatus

Figure 1:
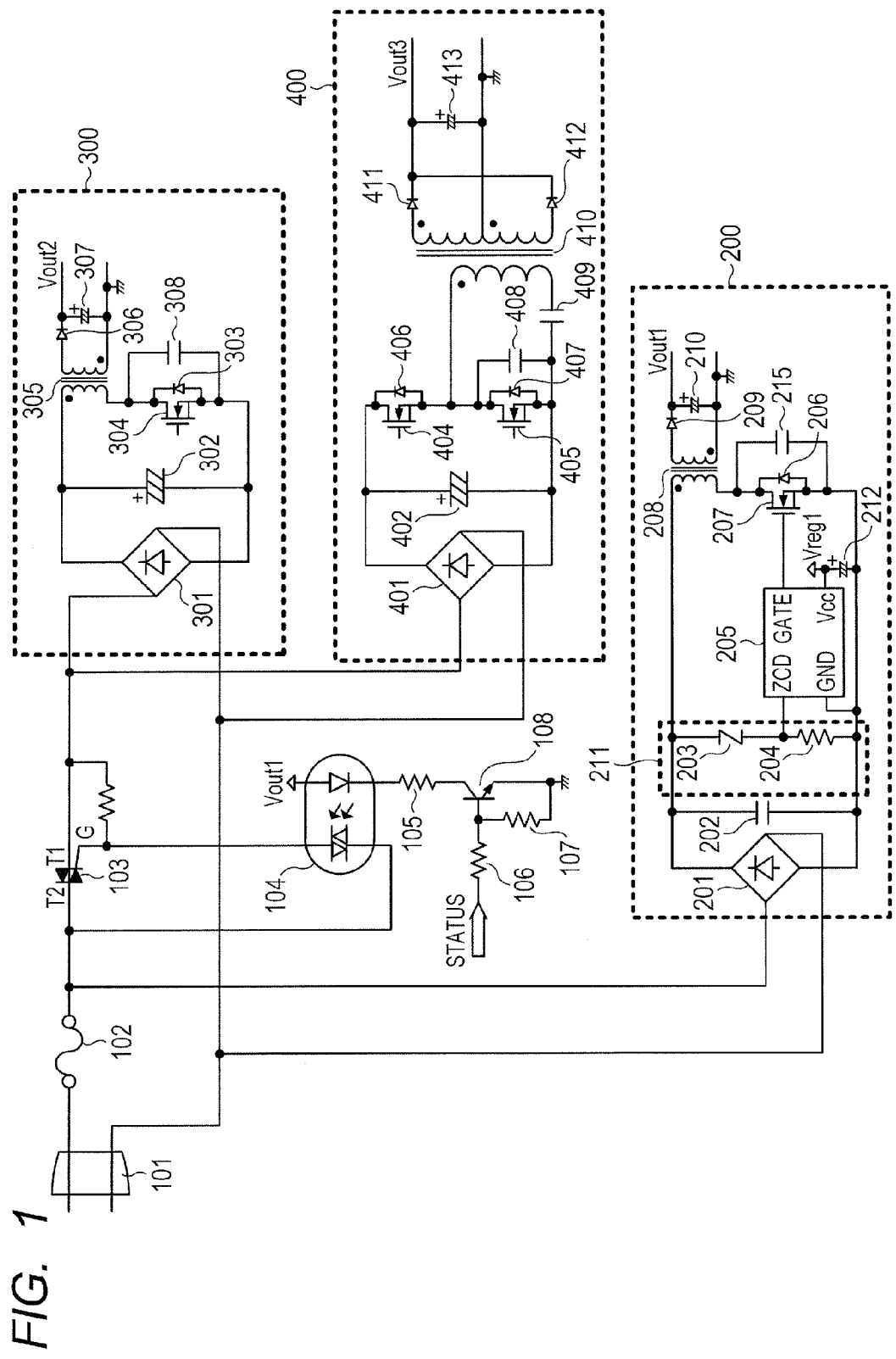
FIG. 1 is a circuit diagram illustrating a structure of a power supply apparatus according to a first embodiment of the present invention.

FIG. 1 is a circuit diagram illustrating a structure of a power supply apparatus of this embodiment to be mounted in electronic equipment such as an image forming apparatus. As illustrated in FIG. 1, the power supply apparatus of this embodiment includes three converters illustrated by broken line boxes, which are an all-night power supply unit 200, a non-all-night power supply unit 300, and a non-all-night power supply unit 400.

All-Night Power Supply Unit

The all-night power supply unit 200 as a first power supply unit outputs a voltage Vout1 as a first voltage. The all-night power supply unit 200 is supplied with power from the commercial AC power source (not shown) via an inlet 101 and a fuse 102, and the power supply from the commercial AC power source is not cut off even when the power supply apparatus is in a standby state (such as a sleep mode). The all-night power supply unit 200 includes a rectifying and smoothing unit including a diode bridge 201 and a rectification capacitor 202 and a switching converter unit disposed on its downstream side. A withstanding voltage of the rectification capacitor 202 for smoothing the input voltage is required to be sufficiently higher than withstanding voltages of aluminum electrolytic capacitors 302 and 402 for smoothing the input voltage of the non-all-night power supply units 300 and 400, in order to support an overvoltage. Therefore, a film capacitor having a high withstanding voltage or an aluminum electrolytic capacitor having a sufficiently high withstanding voltage is used for the rectification capacitor 202. The all-night power supply unit 200 is a small capacity power supply unit of approximately a few watts to ten and a few watts dedicated for supplying power to the equipment in the standby state, and hence the rectification capacitor 202 may have a small capacitance. Therefore, a film capacitor having a feature of small capacitance and high withstanding voltage, or an inexpensive aluminum electrolytic capacitor having a small size and high withstanding voltage can be used.

The switching converter unit of the all-night power supply unit 200 includes a transformer 208 and a switching FET 207, and the operation thereof is controlled by a power supply IC 205. The power supply IC 205 operates with a power supply voltage supplied to a Vcc terminal. A voltage Vreg1 is a voltage induced in an auxiliary winding of the transformer 208, for example, and a capacitor 212 is a rectification capacitor for the voltage supplied to the Vcc terminal. A diode 206 is a body diode of the FET 207, a capacitor 215 is a resonating capacitor, a diode 209 is a secondary rectifying diode, and a capacitor 210 is a secondary rectification capacitor. At the downstream of the rectification capacitor 202, there is disposed an overvoltage detection circuit 211 including a varistor 203 and a resistor 204. In order to achieve power saving in the standby state, the overvoltage detection circuit 211 is required to be a circuit that consumes no power with a predetermined voltage or lower and operates when a voltage higher than the predetermined voltage is applied. In addition, the varistor 203 to be used is selected from those having a varistor voltage lower than the withstanding voltages of the aluminum electrolytic capacitors 302 and 402 for smoothing the input voltage of the non-all-night power supply units 300 and 400.

Non-all-Night Power Supply

The non-all-night power supply units 300 and 400 are supplied with power from the commercial AC power source (not shown) via the inlet 101, the fuse 102, and a switching element 103. When the power supply apparatus is in the standby state (such as the sleep mode), the power supply from the commercial AC power source is cut off. As the switching element 103 disposed in a power supply path from the commercial AC power source (not shown) to the non-all-night power supply units 300 and 400, a bidirectional thyristor (hereinafter referred to as a "triac") is used in this embodiment and all other embodiments, but a relay can be used instead. Further, in the following description, the conductive state of the triac 103 as the switching element is referred to as "ON" or "ON state", while the non-conductive state of the triac 103 is referred to as "OFF" or "OFF state".

The non-all-night power supply unit 300 as a second power supply unit outputs a voltage Vout2 as a second voltage. The voltage Vout2 is a power supply voltage such as 5 V that is used for a control system. The non-all-night power supply unit 300 includes a rectifying and smoothing unit including a diode bridge 301 and the aluminum electrolytic capacitor 302 and a switching converter unit disposed on its downstream side. As the switching converter unit, a quasi-resonant flyback power supply is used similarly to the all-night power supply unit. The switching converter unit includes a switching FET 304, a body diode 303 of the FET 304, a transformer 305, a secondary rectifying diode 306, a secondary rectification capacitor 307, and a resonating capacitor 308. In the switching converter unit, the output voltage Vout2 is fed back to the primary side of the transformer 305 so as to adjust the output voltage by using a control IC (not shown), but description thereof is omitted because this part has no direct relationship with this embodiment.

The non-all-night power supply unit 400 outputs a voltage Vout3. The voltage Vout3 is a power supply voltage such as 24 V used in an actuator and the like. The non-all-night power supply unit 400 includes a rectifying and smoothing unit including a diode bridge 401 and the aluminum electrolytic capacitor 402 and a switching converter unit disposed on its downstream side. As the switching converter unit, a current resonance half bridge converter is used, which bidirectionally energizes a transformer 410. The switching converter unit includes switching FETs 404 and 405, body diodes 406 and 407 of the FETs 404 and 405, a voltage resonance capacitor 408, a current resonance capacitor 409, and the transformer 410. Further, the switching converter unit includes secondary rectifying diodes 411 and 412, and a smoothing aluminum electrolytic capacitor 413. In the switching converter unit, the output voltage Vout3 is fed back to the primary side of the transformer 410 so as to adjust the output voltage by using the control IC (not shown), but description thereof is omitted because this part has no direct relationship with this embodiment.

In addition, a phototriac coupler 104 controls ON and OFF of the triac 103. A zero cross circuit is built in the phototriac coupler 104, and the phototriac coupler 104 supplies power from a T2 terminal of the triac 103 to a G terminal in synchronization with a zero cross signal generated at timing when the input voltage from the commercial AC power source is close to zero volts, so as to turn on the triac 103. By using the phototriac coupler 104 including the built-in zero cross circuit for turning on the triac 103 in synchronization with the zero cross signal, it is possible to prevent inrush current of the non-all-night power supply units 300 and 400. In addition, a transistor 108 is controlled to be turned on and off by a STATUS signal output from a controller (not shown) described later, and an LED unit of the phototriac coupler 104 becomes conductive when the transistor 108 is in the ON state. Further, resistors 105 and 106 are current limiting resistors, and a resistor 107 is a resistor for preventing malfunction due to noise.

Operation of Power Supply Apparatus when Input Voltage is Normal

Figure 2B:
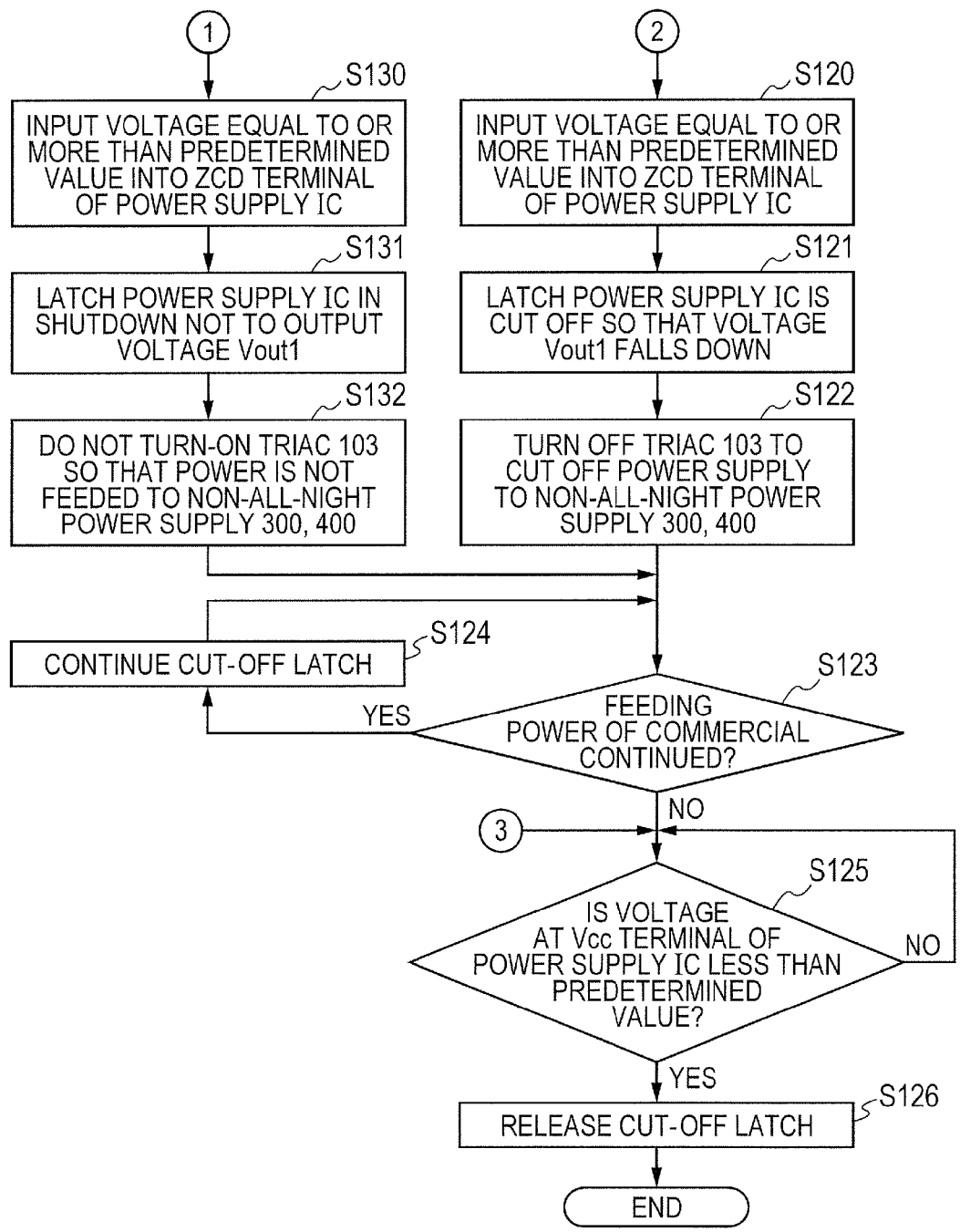
FIG. 2 is comprised of FIGS. 2A and 2B showing flowcharts illustrating an operation of the power supply apparatus of the first embodiment when being supplied with power from a commercial AC power source.

FIGS. 2A and 2B are flowcharts illustrating an operation of the power supply apparatus of this embodiment when being supplied with power from the commercial AC power source. First, an operation of the power supply apparatus when a normal voltage within a rated voltage range is supplied from the commercial AC power source is described with reference to FIGS. 1 and 2.

In Step 101 (hereinafter referred to as "S101") in FIGS. 2A and 2B, supply of power (hereinafter referred to as "power supply") from the commercial AC power source to the all-night power supply unit 200 via the inlet 101 and the fuse 102 is started. In this case, because the triac 103 is turned off, the non-all-night power supply units 300 and 400 are not supplied with power from the commercial AC power source. When the power supply is started, the FET 207 of the all-night power supply unit 200 starts the switching operation so as to supply power to the secondary side via the transformer 208. In S102, the overvoltage detection circuit 211 monitors whether or not the input voltage from the commercial AC power source is within the rated voltage range. Here, the input voltage from the commercial AC power source is within the rated voltage range, and no overvoltage is detected. Therefore, the process proceeds to S103.

In S103, the voltage induced in the secondary side of the transformer 208 of the all-night power supply unit 200 is rectified and smoothed by the diode 209 and the rectification capacitor 210, and the all-night power supply unit 200 outputs the voltage Vout1. In S104, the output voltage Vout1 of the all-night power supply unit 200 is supplied to the controller (not shown) such as a CPU so that the controller (not shown) is activated. Then, the controller (not shown) performs a predetermined start-up process and then outputs a high level STATUS signal so as to turn on the triac 103. In S105, the transistor 108 inputs the high level STATUS signal and becomes the ON state, and hence the LED unit of the phototriac coupler 104 becomes conductive. As described above, because the zero cross circuit is built in the phototriac coupler 104, the phototriac coupler 104 is turned on by the zero cross signal generated just after the LED unit becomes conductive. Thus, the triac 103 is turned on because current flows from the T2 terminal to the G terminal. In S106, the triac 103 is turned on to be conductive, and the power supply from the commercial AC power source (not shown) to the non-all-night power supply unit 300 and the non-all-night power supply unit 400 via the inlet 101, the fuse 102, and the triac 103 is started. In S107, the non-all-night power supply units 300 and 400 respectively output the voltage Vout2 and the voltage Vout3 via the rectifying and smoothing unit and the switching converter unit.

An operation of the switching converter unit of the non-all-night power supply unit 300 is the same as that of the all-night power supply unit 200 described above, and therefore description thereof is omitted. The non-all-night power supply unit 400 performs switching of the voltage rectified and smoothed by the diode bridge 401 and the aluminum electrolytic capacitor 402 by using the FETs 404 and 405 alternately so as to supply power to the secondary side via the transformer 410. The voltage induced in the secondary side of the transformer 410 is rectified and smoothed by the diodes 411 and 412 and the smoothing aluminum electrolytic capacitor 413, and afterward the non-all-night power supply unit 400 outputs the voltage Vout3.

Relationship Between Input Voltage and Withstanding Voltage of Capacitor

The power supply apparatus of this embodiment is designed in such a manner that the input voltage from the commercial AC power source, a withstanding voltage of each power supply unit, and a detection voltage of the detection circuit have the following relationship. Specifically, the following expression (1) is satisfied:

$$V1 > V2 > V3 > Vin\_peak \quad (1),$$

where V1 represents a withstanding voltage of the rectification capacitor 202 of the all-night power supply unit 200, V2 represents a withstanding voltage of the aluminum electrolytic capacitors 302 and 402 of the non-all-night power supply units 300 and 400, V3 represents the detection voltage of the overvoltage detection circuit 211, and Vin_peak represents a peak value of the rated voltage of the commercial AC power source. Here, when the aluminum electrolytic capacitors 302 and 402 of the non-all-night power supply units 300 and 400 have different withstanding voltages, V2 represents a lower withstanding voltage.

For instance, it is assumed that the rectification capacitor 202 is a film capacitor having a withstanding voltage of 630 V, the varistor 203 has a varistor voltage of 180 V, the aluminum electrolytic capacitors 302 and 402 of the non-all-night power supply units 300 and 400 have a withstanding voltage of 200 V, and the commercial AC power source has a rated voltage range of 100 V to 120 V. These voltage values are substituted into the expression (1), and then the following expression (2) is derived.

$$630V > 200V > 180V > 141.4V - 169.7V \quad (2)$$

However, because of variations or the like of elements such as a varistor and a zener diode for detecting an overvoltage, there is a case where the withstanding voltage V2 of the aluminum electrolytic capacitors 302 and 402 of the non-all-night power supply units 300 and 400 and the overvoltage detection voltage V3 cannot satisfy the magnitude relationship of V2>V3. In this case, considering a relationship between the voltage applied to the aluminum electrolytic capacitor and the voltage applying time, a sufficiently low voltage that does not cause valve-open of the electrolytic capacitor in the operation time of the protection circuit is set as V3. In other words, when the protection with a voltage lower than the withstanding voltage of the aluminum electrolytic capacitor cannot be secured, the aluminum electrolytic capacitor is protected with a voltage lower than the voltage that causes the valve-open of the aluminum electrolytic capacitor.

Figure 3:
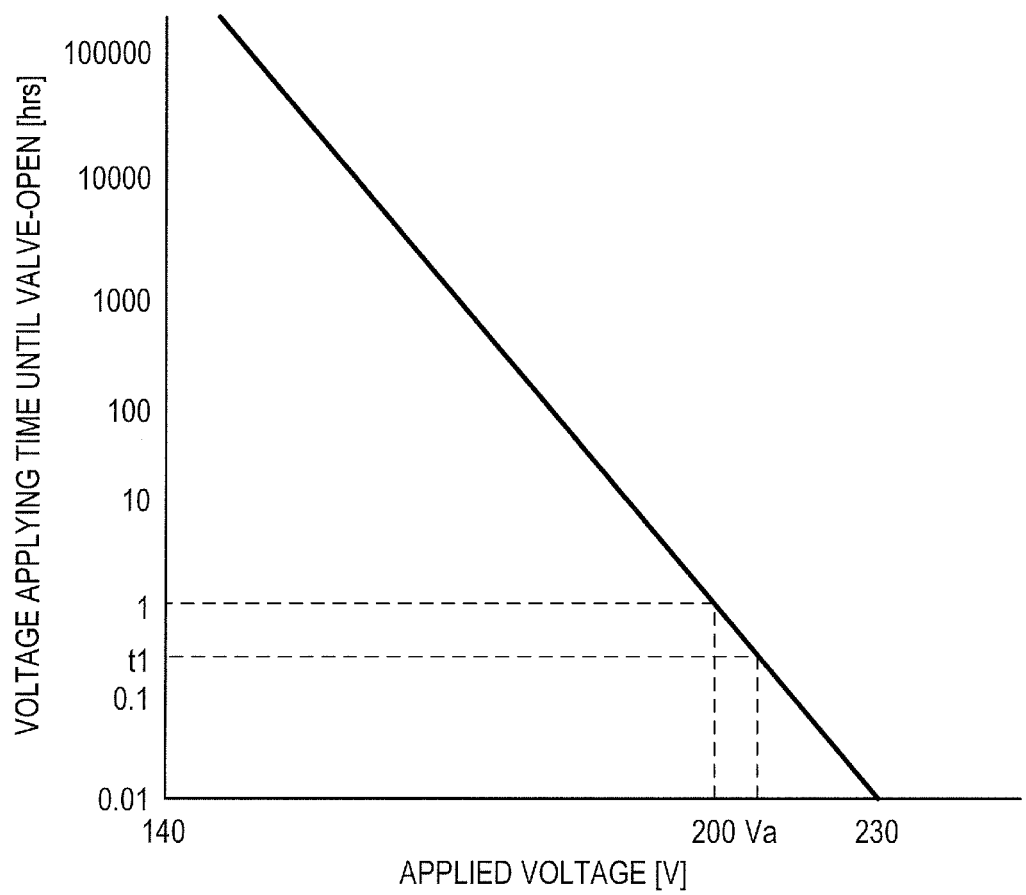
FIG. 3 is a graph showing a relationship between an applied voltage and voltage applying time concerning valve-open of an aluminum electrolytic capacitor.

The withstanding voltage of the aluminum electrolytic capacitor is determined from a viewpoint of life time, and therefore application of a voltage equal to or higher than the withstanding voltage does not always cause an immediate valve-open of the capacitor. FIG. 3 is a graph showing a relationship between the applied voltage and the voltage applying time concerning the valve-open of the aluminum electrolytic capacitor, in which the horizontal axis represents the applied voltage (unit: volts (V)) to the electrolytic capacitor, and the vertical axis represents the voltage applying time (unit: hours (hrs)) until the electrolytic capacitor opens the valve. FIG. 3 shows an example of a characteristic curve indicating a simplified relationship between the applied voltage and the voltage applying time, in which an aluminum electrolytic capacitor having a withstanding voltage of 200 V is exemplified. In a real design, it is necessary to check the characteristic curve of each aluminum electrolytic capacitor to be used.

As shown in the graph of FIG. 3, the aluminum electrolytic capacitor having a withstanding voltage of 200 V does not immediately open the valve when the voltage of 200 V that is equal to the withstanding voltage is applied, but eventually opens the valve when the voltage is continuously applied for a very long period of time (approximately 1 hour). In addition, as understood from FIG. 3, the voltage applying time until the valve-open becomes shorter as the applied voltage is higher. Therefore, when the relationship of V2>V3 cannot be satisfied because of variations of elements such as the varistor and the zener diode for detecting an overvoltage, the following relationship needs to be satisfied. In other words, the detection voltage V3 of the overvoltage detection circuit 211 is set in such a manner that the following expression (3) is satisfied with a margin:

$$Va > V3 > V2 \quad (3),$$

where Va represents a voltage determined from the graph of FIG. 3 at which the aluminum electrolytic capacitor opens the valve when the overvoltage is continuously applied for a time period t1, which is time from the detection of an overvoltage to turn off of the triac 103.

As a result, when the relationship of the expression (3) is satisfied, the aluminum electrolytic capacitors 302 and 402 can be protected even when the voltage V3 detected by the overvoltage detection circuit 211 exceeds the withstanding voltage V2 of the aluminum electrolytic capacitors 302 and 402 of the non-all-night power supply units 300 and 400.

Operation of Power Supply Apparatus when Overvoltage is Supplied

Operation when Overvoltage is Supplied in Normal State

Next, there is described an operation of the power supply apparatus in the case where a voltage within the rated voltage range is supplied from the commercial AC power source to the power supply apparatus, and a certain abnormality occurs in the commercial AC power source so that an overvoltage is applied to the power supply apparatus, with reference to FIGS. 1 and 2.

In S108, the overvoltage detection circuit 211 monitors whether or not the input voltage from the commercial AC power source is within the rated voltage range. Then, when the overvoltage detection circuit 211 detects no overvoltage, the process proceeds to S109. In S109, the non-all-night power supply units 300 and 400 respectively output the voltage Vout2 and the voltage Vout3 via the rectifying and smoothing unit and the switching converter unit. In S110, it is determined whether or not the power supply from the commercial AC power source is continued. When the power supply is continued, the process returns to S108. When the power supply from the commercial AC power source is stopped, the process proceeds to S125 in which the process at the time of stopping the power supply is performed as described later.

On the other hand, when the overvoltage detection circuit 211 detects an overvoltage in S108, the process proceeds to S120. In S120, when the overvoltage detection circuit 211 detects an overvoltage, the varistor 203 becomes conductive, and a voltage equal to or higher than a predetermined value divided by the varistor 203 and the resistor 204 is applied to a ZCD terminal of the power supply IC 205. In S121, when a voltage of a predetermined value or higher is applied to the ZCD terminal continuously for a predetermined time period (for example, 100 µs), the power supply IC 205 shuts down the switching converter unit and retains the cutoff state (this state is hereinafter referred to as "cut-off latch"). When the power supply IC 205 is latched in cut-off, the power supply to the secondary side via the transformer 208 is not performed. Then, a load connected to the all-night power supply unit 200 consumes charge stored in the rectification capacitor 210 so that the output voltage Vout1 falls down. In S122, when the output voltage Vout1 falls down, current does not flow in the LED unit of the phototriac coupler 104, and hence the phototriac coupler 104 and the triac 103 are turned off in turn. Further, when the triac 103 is turned off, the power supply from the commercial AC power source (not shown) to the non-all-night power supply units 300 and 400 is cut off. Further, in this embodiment, because the triac 103 is turned off in the latch mode, the OFF state of the triac 103 continues while the power supply from the commercial AC power source continues even after the overvoltage input from the commercial AC power source is canceled.

In S123, it is determined whether or not the power supply from the commercial AC power source is continued. When the power supply is continued, the process proceeds to S124. When the power supply from the commercial AC power source is stopped, the process proceeds to S125 in which the process at the time of stopping power supply is performed as described later. In S124, the cut-off latch of the power supply IC 205 is continued, and the process returns to S123.

In S125, after the power supply from the commercial AC power source to the power supply apparatus is cut off, the power supply IC 205 determines whether or not the Vcc terminal voltage is a predetermined voltage or lower, and the process of S125 is repeated until the Vcc terminal voltage becomes the predetermined voltage or lower. When it is detected that the Vcc terminal voltage has become the predetermined voltage or lower, the process proceeds to S126. In S126, the power supply IC 205 releases the above-mentioned cut-off latch and finishes the process. Further, when the power supply from the commercial AC power source to the power supply apparatus is started again, the above-mentioned activation operation of the power supply apparatus is performed.

Note that, the reason why the power supply IC 205 performs the cut-off latch operation when an overvoltage is detected is to protect the power supply apparatus from the overvoltage more securely. In other words, if the latch operation is not performed when an overvoltage is detected, there is assumed a case where the overvoltage is frequently applied to the aluminum electrolytic capacitor in a set of processes including application of an overvoltage from the commercial AC power source, the protection operation, cancellation of the overvoltage from the commercial AC power source, and release of the protection operation, and another same process including application of an overvoltage again from the commercial AC power source and the protection operation. In this case, an internal pressure of the aluminum electrolytic capacitor is gradually increased, and finally the valve-open may occur. Therefore, in order to prevent such situation, the cut-off latch operation is performed for protection against the overvoltage in this embodiment. Further, as long as design is made so that the expression (2) or the expression (3) is satisfied, the power supply apparatus can be protected from the overvoltage except for a peculiar case where the overvoltage is repeatedly applied to the power supply apparatus. Therefore, the protection by the latch operation of this embodiment is not essential but is merely a method for enhancing security of the protection.

Operation in Case where Overvoltage is Supplied when Power is Turned on

Next, there is described a case where the input voltage from the commercial AC power source is already an overvoltage when the commercial AC power source is connected to the power supply apparatus, or a case where the power supply apparatus for AC 100 V is connected to the commercial AC power source of an AC 200 V system (AC 220 V to 240 V) by mistake, with reference to FIGS. 1 and 2.

In this case, the overvoltage is detected in S101 just after the power supply apparatus is connected to the commercial AC power source so that the power supply to the all-night power supply unit 200 is started. In other words, in S102, the overvoltage detection circuit 211 monitors whether or not the input voltage from the commercial AC power source is within the rated voltage range. Then, when the overvoltage detection circuit 211 detects an overvoltage, the process proceeds to S130. In S130, when the overvoltage detection circuit 211 detects the overvoltage, the varistor 203 becomes conductive. Then, a voltage equal to or higher than a predetermined value divided by the varistor 203 and the resistor 204 is applied to the ZCD terminal of the power supply IC 205. In S131, the all-night power supply unit 200 once starts the switching. However, after a predetermined time period (for example, 100 µs), the above-mentioned cut-off latch function of the ZCD terminal of the power supply IC 205 operates so that the operation of the switching converter unit is stopped. When the power supply IC 205 is latched in cut-off, the operation of the switching converter unit is promptly stopped, and hence the output voltage Vout1 is not output. In S132, because the output voltage Vout1 is not output from the all-night power supply unit 200, the triac 103 is not turned on. As a result, the non-all-night power supply units 300 and 400 are not supplied with power and thus can be protected from the overvoltage. The process of S123 and subsequent steps, namely the method of resetting the power supply apparatus from the cut-off latch state is the same as described above, and hence description thereof is omitted.

Operation in Standby State

Next, an operation of the power supply apparatus in the standby state is described. In the standby state, the controller (not shown) switches the STATUS signal to low level so as to turn off the transistor 108. As a result, the phototriac coupler 104 and the triac 103 are turned off. Thus, in the standby state, power supply to the non-all-night power supply units 300 and 400 disposed downstream of the triac 103 is cut off so that power consumption can be reduced. Further, in the standby state, the power supply apparatus supplies only the output voltage Vout1 of the all-night power supply unit 200, and hence the power is supplied only to a minimum necessary load such as the controller (not shown). In addition, in this embodiment, the overvoltage detection circuit 211 does not consume power until the input voltage from the commercial AC power source reaches an operating voltage of the varistor 203, but consumes power only after an overvoltage higher than the operating voltage of the varistor 203 is applied. Therefore, in this embodiment, in the standby state, there is no power consumption for turning on the triac 103 as the switching element and for operating the overvoltage detection circuit 211. Thus, it is possible to save power compared with the conventional system.

As described above, according to this embodiment, it is possible to perform the resettable protection in which the overvoltage protection is activated when an abnormality of the input voltage is detected, and afterward is reset. In addition, power consumption in the standby state can be reduced. The overvoltage detection circuit that does not consume power in the standby state is disposed, and when an overvoltage from the commercial AC power source is applied to the power supply apparatus, the triac is made non-conductive so that the power supply apparatus can be protected from the overvoltage. Further, when the overvoltage from the commercial AC power source is canceled, the power supply apparatus can be reset to the normal state. In addition, in the standby state, the triac is non-conductive so that the power supply to the non-all-night power supply is cut off. Thus, power saving in the standby state can be achieved.

The varistor 203 is used for voltage detection in this embodiment, but a constant voltage element such as a zener diode may be used for voltage detection. In other words, as an element for voltage detection, it is possible to use a circuit element that operates only when a predetermined voltage or higher is applied. In addition, the quasi-resonant flyback power supply is used in the switching converter unit of this embodiment, but this embodiment is not limited to this power supply system. It is possible to use other power supply systems such as a ringing choke converter (RCC) system and a pulse width modulation (PWM) system. Similarly, the current resonance half bridge converter is used in the switching converter unit of this embodiment, but without limiting to this system, it is possible to use other power supply systems. Further, the power supply IC is used for controlling the switching converter unit in this embodiment, but this embodiment is not limited to this and can be realized by other methods such as using discrete components.

Next, a second embodiment of the present invention is described.

In the second embodiment, there is described a method of monitoring a voltage across the terminals of a capacitor for smoothing an input voltage of a non-all-night power supply to be protected when an input voltage from a commercial AC power source is an overvoltage, at a position downstream of a switching element (viewed from the commercial AC power source side).

The power supply of this embodiment has a circuit structure in which whether or not the input voltage from the commercial AC power source is an overvoltage is detected after the switching element is turned on. Therefore, the protection function operates after the overvoltage is supplied to the input voltage rectification capacitor of the non-all-night power supply unit at least one time.

In the circuit structure of the first embodiment described above, in the case where the input voltage from the commercial AC power source is already an overvoltage when the equipment is connected to the commercial AC power source, the protection function operates without the overvoltage being applied to the input voltage rectification capacitor of the non-all-night power supply unit, which is different from this embodiment. Therefore, in the first embodiment, it is first detected whether or not the input voltage is an overvoltage, when the power supply from the commercial AC power source to the power supply apparatus is started. In contrast, in the power supply apparatus of this embodiment, it is detected whether or not the input voltage is an overvoltage, after the switching element is turned on.

Structure of Power Supply Apparatus

Figure 4:
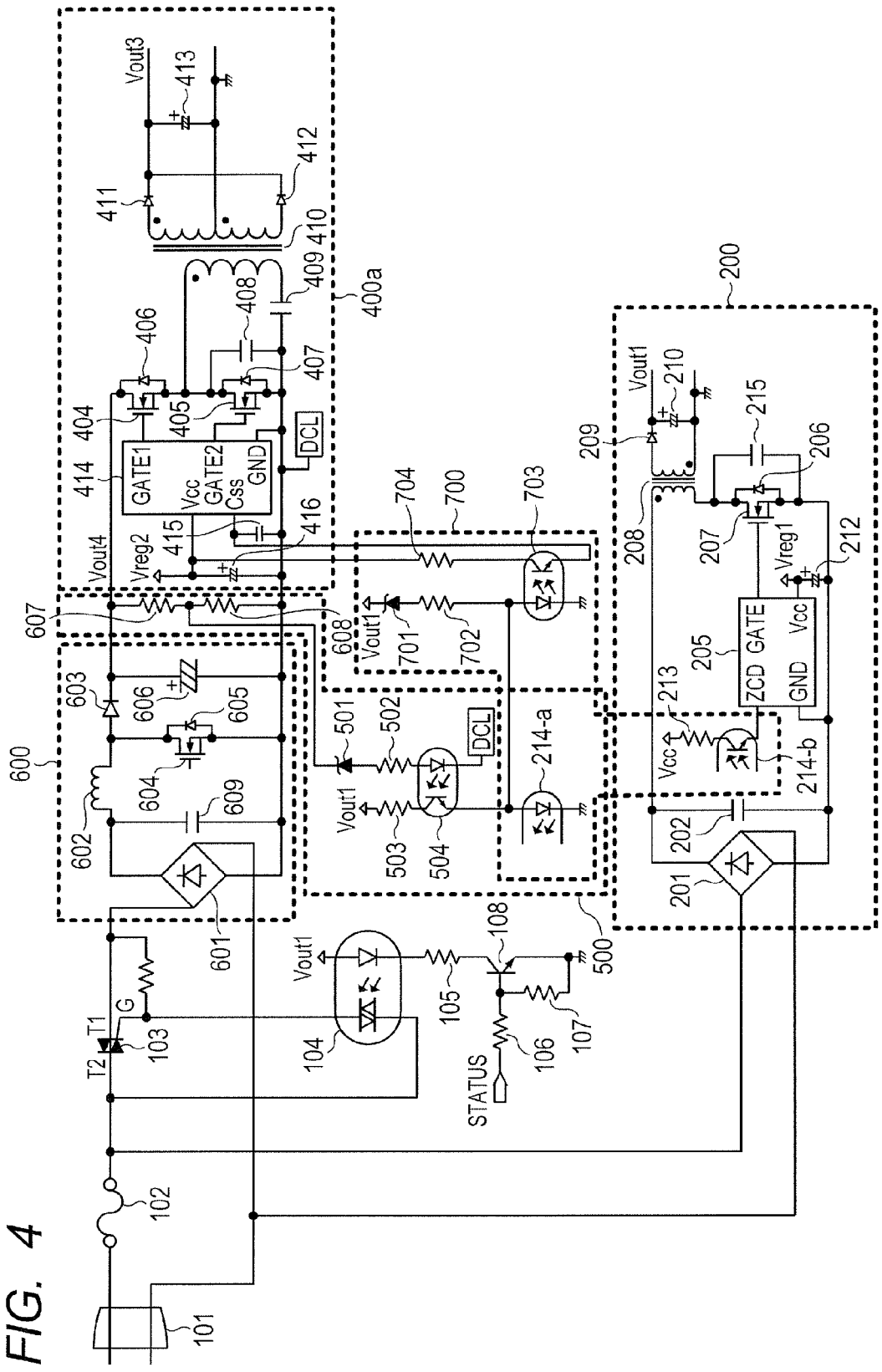
FIG. 4 is a circuit diagram illustrating a structure of a power supply apparatus according to a second embodiment of the present invention.

FIG. 4 is a circuit diagram illustrating a structure of a power supply apparatus of this embodiment to be mounted in electronic equipment such as an image forming apparatus. As illustrated in FIG. 4, the power supply apparatus of this embodiment includes three converters illustrated by broken line boxes, which are an all-night power supply unit 200, a converter 400a, and a PFC circuit 600. Note that, the all-night power supply unit 200, the triac 103, and the peripheral circuit thereof are the same as those in the first embodiment illustrated in FIG. 1, and hence description thereof is omitted.

Non-all-Night Power Supply Unit

The non-all-night power supply unit includes the PFC circuit 600 (broken line box portion) (hereinafter also referred to as "non-all-night power supply unit 600") and the converter 400a disposed on its downstream side (broken line box portion) (hereinafter also referred to as "non-all-night power supply unit 400a"). The PFC circuit 600 includes a diode bridge 601, a film capacitor 609, a choke coil 602, a switching FET 604, a body diode 605 of the FET 604, a regenerative diode 603, and a smoothing aluminum electrolytic capacitor 606. The PFC circuit 600 has a function of stepping up the input voltage from the commercial AC power source and improving a power factor thereof. An output voltage Vout4 of the PFC circuit 600 is approximately 400 V in this embodiment, for example. The output voltage Vout4 of the PFC circuit 600 is supplied to the converter 400a so that the output voltage Vout3 is generated.

The switching converter unit of the converter 400a has the same circuit structure as the switching converter unit of the non-all-night power supply unit 400 of the first embodiment illustrated in FIG. 1 and is denoted by the same symbols so that description thereof is omitted. A capacitor 415 is connected to a Css terminal of a power supply IC 414 and is in charge of soft start. The power supply IC 414 starts control operation when a voltage necessary for the operation is supplied to the Vcc terminal. A capacitor 416 is a rectification capacitor for the input voltage to the Vcc terminal. As an input voltage Vreg2 to the Vcc terminal, a voltage generated in an auxiliary winding of the choke coil 602 of the PFC circuit 600, or a voltage induced in an auxiliary winding of the transformer 410 is used. Further, the PFC circuit 600 controls a feedback voltage of the output voltage Vout4 by a PFC control IC (not shown) so as to adjust the output voltage. The converter 400a feeds back the output voltage Vout3 to the primary side and adjusts the output voltage by using the power supply IC 414. An adjustment operation of the output voltage has no direct relationship with this embodiment, and hence description thereof is omitted. The power supply system of the switching converter unit of the non-all-night power supply unit 400a is not limited to the current resonance half bridge converter of this embodiment, and other power supply systems may be used.

Overvoltage Protection Circuit

The all-night power supply unit 200 includes an OVP circuit 700 that monitors the output voltage Vout1 and stops operation of the all-night power supply unit 200 and the non-all-night power supply unit 400a when the output voltage Vout1 becomes a predetermined voltage or higher. For instance, it is assumed that the voltage value of the output voltage Vout1 in the normal state is 5 V. When an abnormality occurs in the circuit so that the voltage value of the output voltage Vout1 rises to approximately 7 V, the OVP circuit 700 operates.

The OVP circuit 700 includes a zener diode 701 for monitoring voltage, current limiting resistors 213, 702, and 704, and photocouplers 214 (214-a and 214-b) and 703. Further, when the output voltage Vout1 of the all-night power supply unit 200 becomes equal to or higher than a breakdown voltage (zener voltage) of the voltage monitoring zener diode 701 so that the zener diode 701 becomes conductive, the OVP circuit 700 operates. When the zener diode 701 becomes conductive, the LED unit (214-a) of the photocoupler 214 becomes conductive so that the phototransistor (214-b) of the photocoupler 214 is turned on. Thus, the voltage Vcc is applied to the ZCD terminal of the power supply IC 205 via the resistor 213. As described above in the first embodiment, the ZCD terminal has a cut-off latch function, and the power supply IC 205 permits the switching converter unit of the all-night power supply unit 200 to be latched in cut off. In addition, when the zener diode 701 is conductive, the LED unit of the photocoupler 703 becomes conductive so that the phototransistor of the photocoupler 703 becomes the ON state. Then, the voltage supplied to the Vcc terminal of the power supply IC 414 is applied to the Css terminal via the resistor 704. Similarly to the ZCD terminal of the power supply IC 205, the Css terminal of the power supply IC 414 has a cut-off latch function for operation of the power supply IC 414 when a predetermined voltage is applied.

When the output voltage Vout1 of the all-night power supply unit 200 becomes an overvoltage, not only the operation of the all-night power supply unit 200 but also the operation of the non-all-night power supply unit 400a is stopped. This function is called "protection cooperation function", which is for preventing a single power supply. The output voltage Vout1 is supplied to a load of the control system, and the output voltage Vout3 is supplied to an actuator or the like. Therefore, in the case where the output voltage Vout1 is cut off by the OVP circuit 700, when the output voltage Vout3 is not promptly cut off, a driver of the actuator or the like may be broken down by the single power supply.

Here, the triac 103 disposed upstream of the non-all-night power supply units 400a and 600 uses the output voltage Vout1 of the all-night power supply unit 200 as the driving power. Therefore, when the output voltage Vout1 is cut off by the OVP circuit 700, power supply to the non-all-night power supply units 600 and 400a from the commercial AC power source (not shown) is cut off so that the output voltage Vout3 falls down. In other words, when the output voltage Vout1 of the all-night power supply unit 200 falls down by the cut-off by the OVP circuit 700, the triac 103 is turned off. Then, when the charges stored in the aluminum electrolytic capacitor 606 of the PFC circuit 600 and the aluminum electrolytic capacitor 413 of the converter 400a are completely consumed by the load, the output Vout3 falls down. However, it may take time of a few hundreds milliseconds to a few seconds until the load completely consumes the charges stored in the aluminum electrolytic capacitors 606 and 413, and during this period, a single power supply state continues in which only the converter 400a operates. Therefore, the protection cooperation function is provided for promptly falling down the output of the output voltage Vout3 of the converter 400a when the OVP circuit 700 operates responding to the output voltage Vout1 of the all-night power supply unit 200.

Overvoltage Detection Circuit

There is provided an overvoltage detection circuit 500 for protecting the aluminum electrolytic capacitor 606 of the PFC circuit 600 when an overvoltage is applied from the commercial AC power source. The overvoltage detection circuit 500 includes voltage division resistors 607 and 608, a voltage monitoring zener diode 501, current limiting resistors 502 and 503, and a photocoupler 504. The overvoltage detection circuit 500 monitors a voltage across the terminals of the aluminum electrolytic capacitor 606. When detecting an overvoltage, the overvoltage detection circuit 500 shuts down and latches the cut-off state of operations of the all-night power supply unit 200 and the non-all-night power supply unit 400a so as to protect the circuit from the overvoltage. In FIG. 4, one terminal of the LED unit of the photocoupler 504 is connected to a low voltage side (DCL) of the converter 400a.

Operation of Power Supply Apparatus

Figures 5, 5A, 5B:
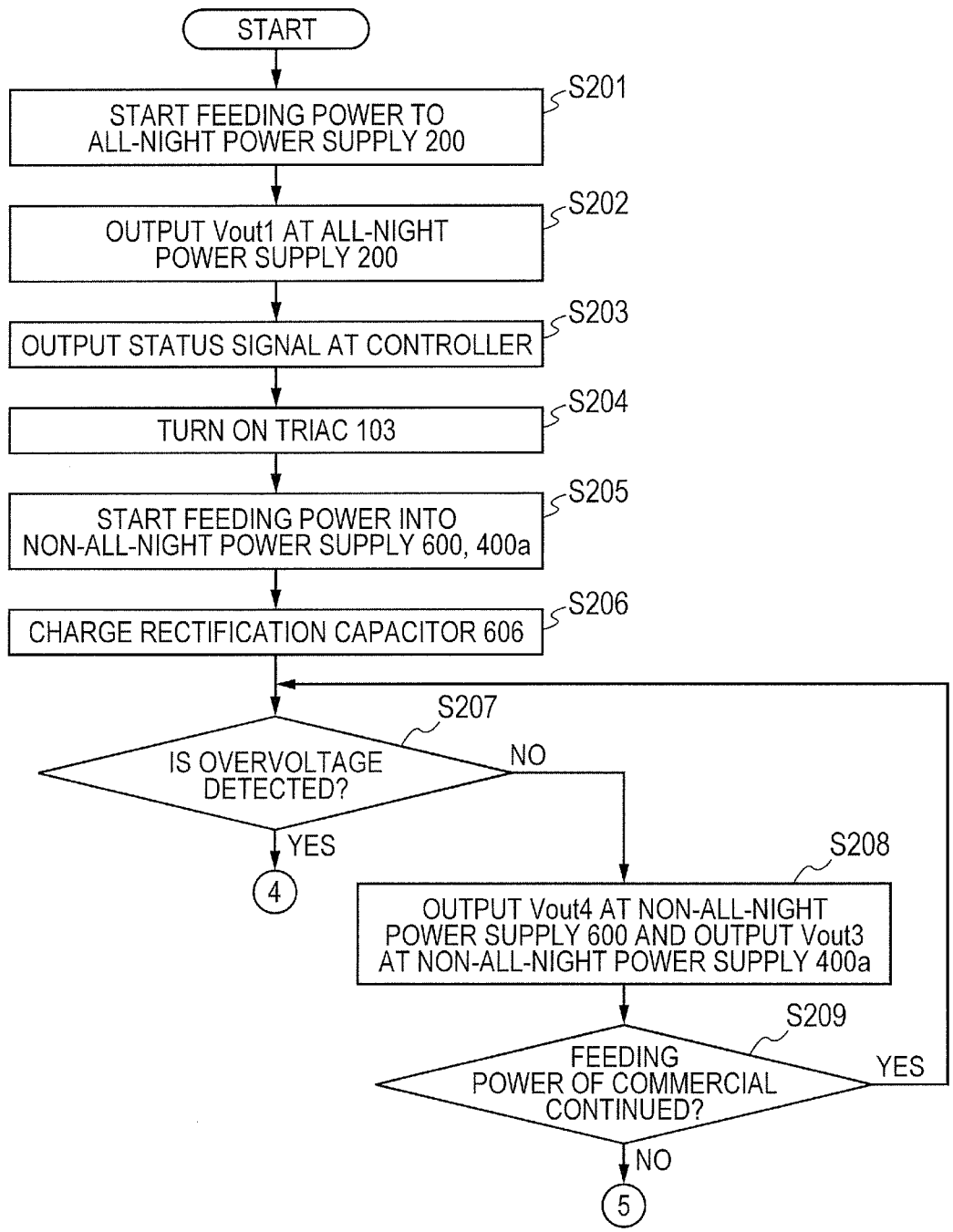
FIG. 5 is comprised of FIGS. 5A and 5B showing flowcharts illustrating an operation of the power supply apparatus of the second embodiment when being supplied with power from the commercial AC power source.
Figure 5B:
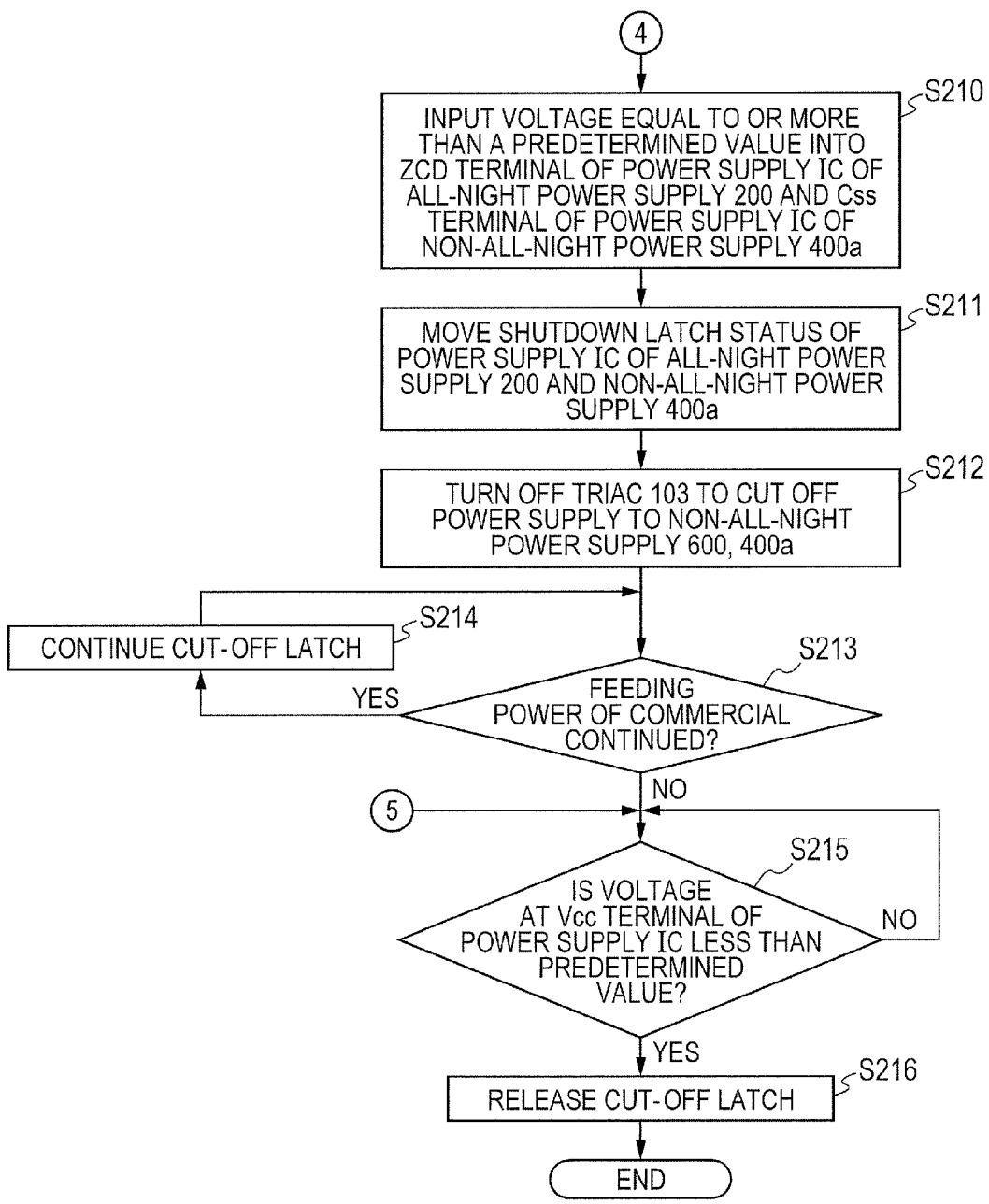

FIGS. 5A and 5B are flowcharts illustrating an operation of the power supply apparatus of this embodiment when being supplied with power from the commercial AC power source. First, there is described an operation of the power supply apparatus when a normal voltage in the rated voltage range is supplied from the commercial AC power source, with reference to FIGS. 4 and 5.

Operation when Input Voltage is Normal

In S201, the power supply to the all-night power supply unit 200 from the commercial AC power source via the inlet 101 and the fuse 102 is started. In S202, when the power supply is started, the FET 207 of the all-night power supply unit 200 starts switching operation so that the all-night power supply unit 200 outputs the voltage Vout1. In S203, the output voltage Vout1 is supplied to the controller (not shown) such as a CPU so that the controller (not shown) is activated. Then, after performing the predetermined start-up process, the controller outputs the high level STATUS signal so as to turn on the triac 103. In S204, the transistor 108 inputs the high level STATUS signal and becomes the ON state. Next, the phototriac coupler 104 is turned on by the zero cross signal generated just after the LED unit of the phototriac coupler 104 becomes conductive. Thus, the triac 103 is turned on because current flows from the T2 terminal to the G terminal. In S205, when the triac 103 is turned on to be conductive, power supply from the commercial AC power source (not shown) to the non-all-night power supply unit 600 and the non-all-night power supply unit 400a via the inlet 101, the fuse 102, and the triac 103 is started. In S206, by the power supply from the commercial AC power source to the non-all-night power supply unit 600, charges are stored in the smoothing aluminum electrolytic capacitor 606 of the non-all-night power supply unit 600.

In S207, the overvoltage detection circuit 500 monitors whether or not the input voltage from the commercial AC power source is within the rated voltage range based on the voltage across the terminals of the aluminum electrolytic capacitor 606 divided by the voltage division resistors 607 and 608. Further, when an overvoltage is detected, the process proceeds to S210. When no overvoltage is detected, the process proceeds to S208. In S208, the non-all-night power supply units 600 and 400a output the voltage Vout4 and the voltage Vout3, respectively. In S209, it is determined whether or not the power supply from the commercial AC power source is continued. When the power supply is continued, the process returns to S207. When the power supply from the commercial AC power source is stopped, the process proceeds to S215 in which the process at the time of stopping power supply is performed as described later.

Operation when Input Voltage is Overvoltage

In S207, the overvoltage detection circuit 500 detects whether or not the input voltage from the commercial AC power source is an overvoltage based on the voltage across the terminals of the aluminum electrolytic capacitor 606 divided by the voltage division resistors 607 and 608. When the voltage divided by the voltage division resistors 607 and 608 becomes the breakdown voltage (zener voltage) or higher of the voltage monitoring zener diode 501, the zener diode 501 becomes conductive so that an overvoltage is detected, and the process proceeds to S210. In S210, when the zener diode 501 becomes conductive, the LED unit of the photocoupler 504 becomes conductive so that the phototransistor of the photocoupler 504 is turned on, and hence the photocouplers 214 and 703 become the ON state. Then, as a result, a voltage of a predetermined value or higher is applied to the ZCD terminal of the power supply IC 205 of the all-night power supply unit 200 and the Css terminal of the power supply IC 414 of the non-all-night power supply unit 400a. Thus, in S211, the power supply IC 205 of the all-night power supply unit 200 and the power supply IC 414 of the non-all-night power supply unit 400a perform the cut-off latch, and hence the output voltages Vout1 and Vout3 fall down. In S212, when the output voltage Vout1 of the all-night power supply unit 200 falls down, current does not flow in the LED unit of the phototriac coupler 104 so that the triac 103 is turned off. Further, when the triac 103 is turned off, the power supply to the non-all-night power supply units 600 and 400a is cut off. Further, because the triac 103 is turned off in the latch mode, the OFF state of the triac 103 is continued even after the overvoltage from the commercial AC power source is canceled as long as the power supply from the commercial AC power source is continued.

In S213, it is determined whether or not the power supply from the commercial AC power source is continued. When the power supply is continued, the process proceeds to S214. When the power supply from the commercial AC power source is stopped, the process proceeds to S215 in which the process at the time of stopping power supply is performed as described later. In S214, the cut off latch of the power supply IC 205 and the power supply IC 414 is continued, and the process returns to S213.

In S215, after the power supply from the commercial AC power source to the power supply apparatus is cut off, the power supply IC 205 determines whether or not the Vcc terminal voltage is a predetermined voltage or lower, and repeats the process of S215 until the Vcc terminal voltage becomes the predetermined voltage or lower. When it is detected that the Vcc terminal voltage becomes the predetermined voltage or lower, the process proceeds to S216. In S216, the power supply IC 205 and the power supply IC 414 release the cut off latch as described above and finish the process. Further, when the power supply from the commercial AC power source to the power supply apparatus is started again, the activation operation of the power supply apparatus is performed as described above.

Relationship Between Input Voltage and Withstanding Voltage of Capacitor

The power supply apparatus of this embodiment is designed in such a manner that the input voltage from the commercial AC power source, a withstanding voltage of each power supply unit, and a detection voltage of the detection circuit have the following relationship. Specifically, the following expression (4) is satisfied:

$$V1 > V2 > V3 > V4 > V_{in\_peak} \quad (4),$$

where V1 represents a withstanding voltage of the rectification capacitor 202 of the all-night power supply unit 200, V2 represents a withstanding voltage of the aluminum electrolytic capacitor 606 of the PFC circuit 600, V3 represents a voltage detected by the overvoltage detection circuit 500, V4 represents an instantaneous voltage across the terminals of the aluminum electrolytic capacitor 606 generated in a normal operation of the PFC circuit 600 (overshoot voltage or the like), and Vin_peak represents a peak value of the rated voltage of the commercial AC power source.

For instance, it is assumed that the rectification capacitor 202 is a film capacitor having a withstanding voltage of 630 V, the aluminum electrolytic capacitor 606 of the PFC circuit 600 has a withstanding voltage of 450 V, and the voltage detected by the overvoltage detection circuit 500 (voltage across the terminals of the aluminum electrolytic capacitor before voltage division by the resistors) is 440 V. Further, it is assumed that the instantaneous voltage V4 across the terminals of the aluminum electrolytic capacitor 606 is 430 V, and the rated voltage range of the commercial AC power source is 100 V to 120 V. These voltage values are substituted into the expression (4), and then the following expression (5) is derived.

$$630V > 450V > 440V > 430V > 141.4V - 169.7V \quad (5)$$

However, because of variations or the like of elements (such as a varistor and a zener diode) for detecting an overvoltage, there is a case where the withstanding voltage V2 of the aluminum electrolytic capacitor 606 and the voltage V3 detected by the overvoltage detection circuit 500 cannot satisfy the magnitude relationship of V2>V3. In this case, similarly to the first embodiment, the detection voltage V3 of the overvoltage detection circuit is set based on the relationship between the applied voltage and the voltage applying time concerning the valve-open of the aluminum electrolytic capacitor shown in FIG. 3. A voltage Vb at which the aluminum electrolytic capacitor opens the valve when the overvoltage is continuously applied for a time period t2 is determined based on FIG. 3, in which the time period t2 is the time from detection of an overvoltage to turn off of the triac 103. Then, the overvoltage detection voltage V3 is set in such a manner that the following expression (6) is satisfied with a margin. Here, the voltage Vb and the time period t2 are not shown in FIG. 3, but a relationship between the voltage Vb and the time period t2 is the same as the relationship between the voltage Va and the time period t1 shown in FIG. 3.

$$Vb > V3 > V2 \quad (6)$$

As a result, when the magnitude relationship of the expression (6) is satisfied, the aluminum electrolytic capacitor can be protected even when the overvoltage detection voltage V3 exceeds the withstanding voltage V2 of the aluminum electrolytic capacitor 606 for smoothing the output voltage of the PFC circuit 600.

Operation in Standby State

In the standby state, the triac 103 is turned off similarly to the first embodiment. Therefore, the power supply from the commercial AC power source to the PFC circuit 600 is cut off. As a result, the PFC circuit 600, the converter 400a, and the overvoltage detection circuit 500 do not consume power, and hence power consumption in the standby state can be reduced.

As described above, according to this embodiment, it is possible to perform the resettable protection in which the overvoltage protection is activated when an abnormality of the input voltage is detected, and afterward is reset. In addition, power consumption in the standby state can be reduced.

Next, a third embodiment of the present invention is described.

In the third embodiment, there is described a method of monitoring the input voltage from the commercial AC power source at a position upstream of the switching element (viewed from the commercial AC power source side), which is different from the method of the first embodiment. An operation of the power supply apparatus described in this embodiment is generally the same as that of the power supply apparatus described in the first embodiment, but an operation when an overvoltage is applied to the power supply apparatus from the commercial AC power source is different. In the power supply apparatus described in the first embodiment, the power supply IC performs the cut off operation when an overvoltage is applied. In contrast, in the power supply apparatus described in this embodiment, an external circuit performs the cut off operation. Therefore, in the power supply apparatus described in this embodiment, an operation when an overvoltage is detected is different from that of the power supply apparatus described in the first embodiment.

Structure of Power Supply Apparatus

Figure 6:
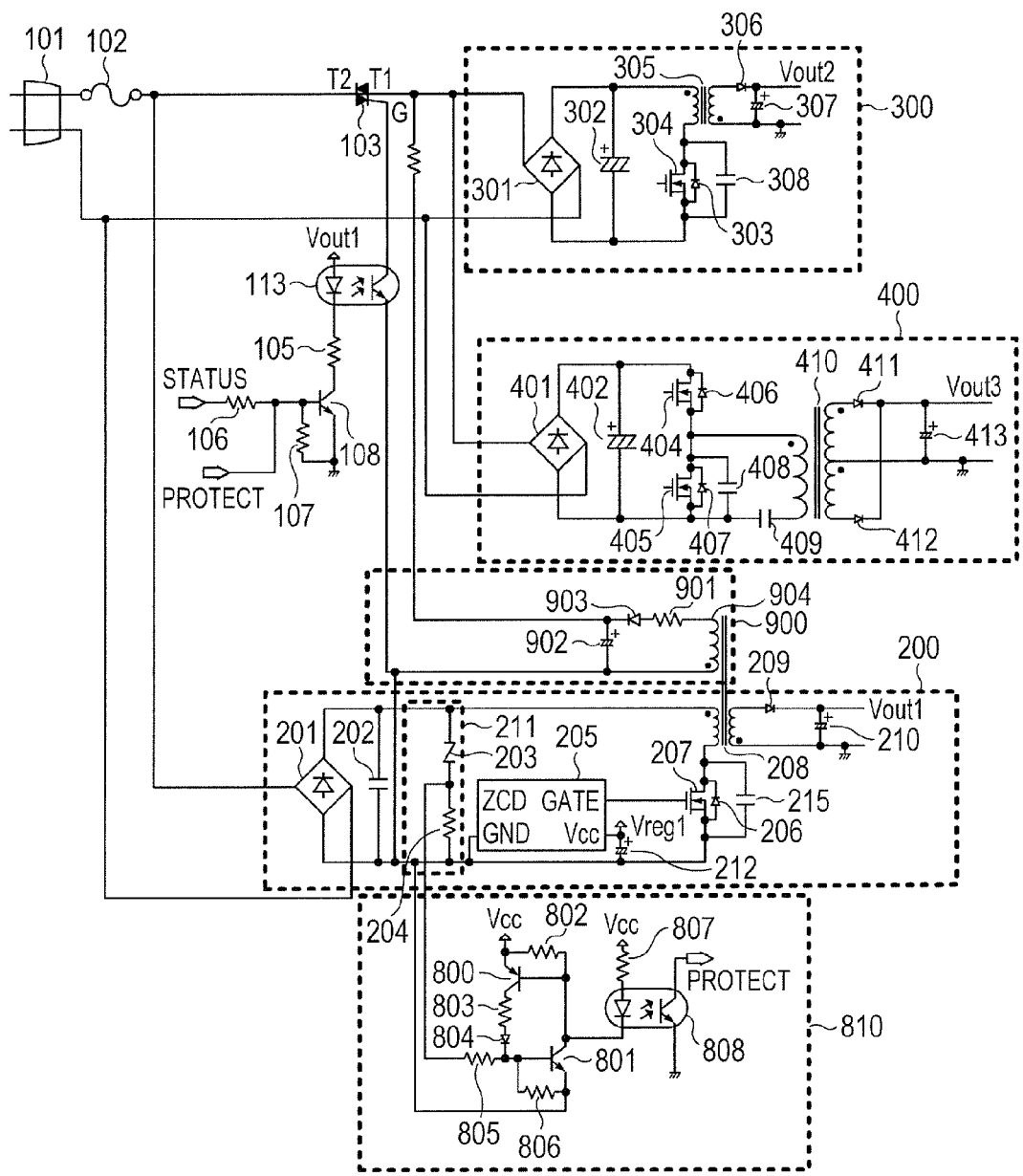
FIG. 6 is a circuit diagram illustrating a structure of a power supply apparatus according to a third embodiment of the present invention.

FIG. 6 is a circuit diagram illustrating a structure of a power supply apparatus of this embodiment to be mounted in electronic equipment such as an image forming apparatus. As illustrated in FIG. 6, the power supply apparatus of this embodiment includes three converters illustrated by broken line boxes, which are an all-night power supply unit 200, a non-all-night power supply unit 300, and a non-all-night power supply unit 400. Note that, circuit structures and operations of the all-night power supply unit 200 and the non-all-night power supply units 300 and 400 are the same as those of the first embodiment, and description thereof is omitted. In addition, the triac 103 and the peripheral circuit are the same as those of the first embodiment illustrated in FIG. 1, and description thereof is omitted.

Drive Voltage Generation Circuit

A drive voltage generation circuit 900 (broken line box portion) rectifies and smooths the voltage induced in an auxiliary winding 904 of the transformer 208 of the all-night power supply unit 200 by a resistor 901, a diode 903, and a capacitor 902 so as to generate the triac drive voltage. The drive voltage generation circuit 900 supplies the generated drive voltage to the triac 103 via a photocoupler 113 so that the triac 103 operates in a trigger mode 2 and a trigger mode 3.

Latch Circuit

A latch circuit 810 (broken line box portion) for retaining the overvoltage detection state includes transistors 800 and 801, resistors 802 to 807, and a photocoupler 808. The overvoltage detection of the commercial AC power source is performed by the overvoltage detection circuit 211. When the varistor 203 of the overvoltage detection circuit 211 detects a predetermined voltage or higher, the varistor 203 becomes conductive so that the voltage is applied to the latch circuit 810. When the voltage is applied to the latch circuit 810 so that the transistor 801 is turned on, the transistor 800 is turned on. Once the transistor 800 is turned on, the transistors 800 and 801 maintains the ON state regardless of a state of the overvoltage detection circuit 211, so as to maintain the ON state of the photocoupler 808. When the photocoupler 808 is turned on, a PROTECT signal becomes low level. Then, because the PROTECT signal is input to a base terminal of the transistor 108, the transistor 108 becomes the OFF state when the PROTECT signal becomes low level. As a result, the photocoupler 113 becomes the OFF state so that the triac drive voltage generated by the drive voltage generation circuit 900 is not supplied to the triac 103. Then, the triac 103 is turned off, and hence the power supply to the non-all-night power supply units 300 and 400 is cut off.

Operation of Power Supply Apparatus

Figure 7B:
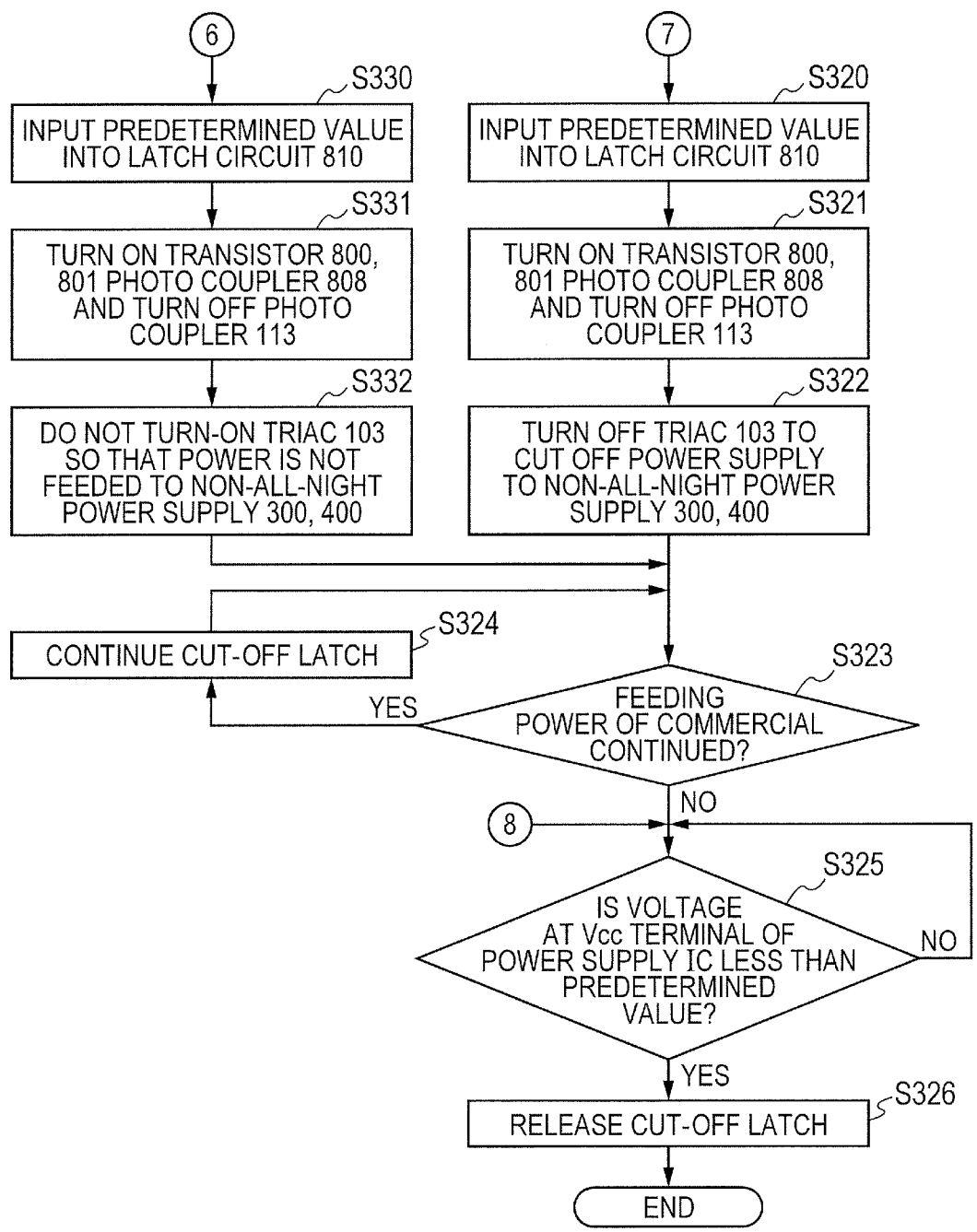
FIG. 7 is comprised of FIGS. 7A and 7B showing flowcharts illustrating an operation of the power supply apparatus of the third embodiment when being supplied with power from the commercial AC power source.

FIGS. 7A and 7B are flowcharts illustrating an operation of the power supply apparatus of this embodiment when being supplied with power from the commercial AC power source. In the following, an operation of the power supply apparatus of this embodiment is described with reference to FIGS. 6 and 7. The operation of the power supply apparatus of this embodiment is generally the same as the power supply apparatus of the first embodiment, and hence detailed description of the operation overlapping with that in the first embodiment is omitted.

In S301, the power supply to the all-night power supply unit 200 from the commercial AC power source via the inlet 101 and the fuse 102 is started. In this case, because the triac 103 is turned off, the non-all-night power supply units 300 and 400 are not supplied with the power from the commercial AC power source. In S302, when the power supply to the all-night power supply unit 200 is started, the FET 207 of the all-night power supply unit 200 starts switching operation so that the all-night power supply unit 200 outputs the voltage Vout1. Further, when the voltage Vout1 is output, the drive voltage generation circuit 900 outputs the triac drive voltage.

In S303, the overvoltage detection circuit 211 monitors the input voltage from the commercial AC power source. When the input voltage is within the rated voltage range, the process proceeds to S304. When an overvoltage is detected, the process proceeds to S330. In S304, the controller (not shown) outputs the high level STATUS signal. In S305, the transistor 108 and the photocoupler 113 are turned on in turn by the high level STATUS signal so that the triac 103 is turned on. Then, in S306, when the triac 103 is turned on, the power supply to the non-all-night power supply units 300 and 400 from the commercial AC power source (not shown) is started. As a result, in S307, the non-all-night power supply unit 300 outputs the voltage Vout2, and the non-all-night power supply unit 400 outputs the voltage Vout3.

In S308, the overvoltage detection circuit 211 monitors whether or not the input voltage from the commercial AC power source is an overvoltage. When no overvoltage is detected, the process proceeds to S309. When an overvoltage is detected, the process proceeds to S320. In S309, the non-all-night power supply units 300 and 400 output the voltage Vout2 and the voltage Vout3, respectively. In S310, it is determined whether or not the power supply from the commercial AC power source is continued. When the power supply is continued, the process returns to S308. When the power supply from the commercial AC power source is stopped, the process proceeds to S325 so as to perform the process at the time of stopping power supply as described later.

In S320, a predetermined voltage is applied to the latch circuit 810. As a result, in S321, the transistors 800 and 801 become the ON sate so that the photocoupler 808 is turned on. Then, the low level PROTECT signal is output. When the low level PROTECT signal is input to the base terminal of the transistor 108, the transistor 108 is turned off. As a result, the photocoupler 113 becomes the OFF state. In S322, when the photocoupler 113 becomes the OFF state, the triac 103 is turned off. Thus, the power supply from the commercial AC power source to the non-all-night power supply units 300 and 400 is cut off. Further, because the triac 103 is turned off in the latch mode, the OFF state of the triac 103 is continued even after the overvoltage input from the commercial AC power source is canceled as long as the power supply from the commercial AC power source is continued.

In S323, it is determined whether or not the power supply from the commercial AC power source is continued. When the power supply is continued, the process proceeds to S324. When the power supply from the commercial AC power source is stopped, the process proceeds to S325 in which the process at the time of stopping power supply is performed as described later. In S324, the cut-off latch state of the latch circuit 810 is continued, and the process returns to S323.

In S325, after the power supply from the commercial AC power source to the power supply apparatus is cut off, the power supply IC 205 determines whether or not the Vcc terminal voltage is a predetermined voltage or lower, and repeats the process of S325 until the Vcc terminal voltage becomes the predetermined voltage or lower. When it is detected that the Vcc terminal voltage has become the predetermined voltage or lower, the process proceeds to S326. In S326, when the Vcc terminal voltage becomes the predetermined voltage or lower, the latch state of the latch circuit 810 is released, and the process is finished. Further, when the power supply from the commercial AC power source to the power supply apparatus is started again, the activation operation of the power supply apparatus is performed as described above.

In addition, in the case where the input voltage from the commercial AC power source is already an overvoltage when the power supply apparatus is connected to the commercial AC power source, the overvoltage detection circuit 211 detects the overvoltage in S303, and the process proceeds to S330. In S330, a predetermined voltage is applied to the latch circuit 810. As a result, the transistors 800 and 801 become the ON state in S331 so that the photocoupler 808 is turned on, and the low level PROTECT signal is output. When the low level PROTECT signal is input to the base terminal of the transistor 108, the transistor 108 is turned off. As a result, the photocoupler 113 stays in the OFF state. In S332, because the photocoupler 113 stays in the OFF state, the triac 103 is not turned on but stays in the OFF state. As a result, power is not supplied from the commercial AC power source to the non-all-night power supply units 300 and 400. Further, the process of S323 and subsequent steps is the same as described above, and description thereof is omitted.

In the power supply apparatus of this embodiment, the input voltage from the commercial AC power source, the withstanding voltage of each power supply unit, and the detection voltage of the detection circuit are set to satisfy the expression (1) or the expression (2) similarly to the first embodiment. In addition, an operation in the standby state is the same as that in the first embodiment, and description thereof is omitted.

As described above, according to this embodiment, it is possible to perform the resettable protection in which the overvoltage protection is activated when an abnormality of the input voltage is detected, and afterward is reset. In addition, power consumption in the standby state can be reduced. Further, the power supply apparatus of this embodiment includes the all-night power supply unit having a sufficiently high withstanding voltage with respect to the commercial AC power source and can operate the all-night power supply unit even when an overvoltage is applied. Therefore, it is possible, for example, to store the event that a commercial AC voltage is applied to the equipment and the protection circuit has operated, in a storage device disposed in the equipment, or to inform a user of generation of an overvoltage during operation of the overvoltage protection circuit, by using an operation panel or a buzzer.

Next, a fourth embodiment of the present invention is described.

The power supply apparatus described in the first to third embodiments is applicable as, for example, a low voltage power supply of an image forming apparatus, that is, a power supply for supplying power to a controller (control unit) or a driving unit such as a motor. A description is now given of a structure of the image forming apparatus to which the power supply apparatus according to the first to third embodiments is applied.

Structure of Image Forming Apparatus

Figure 8:
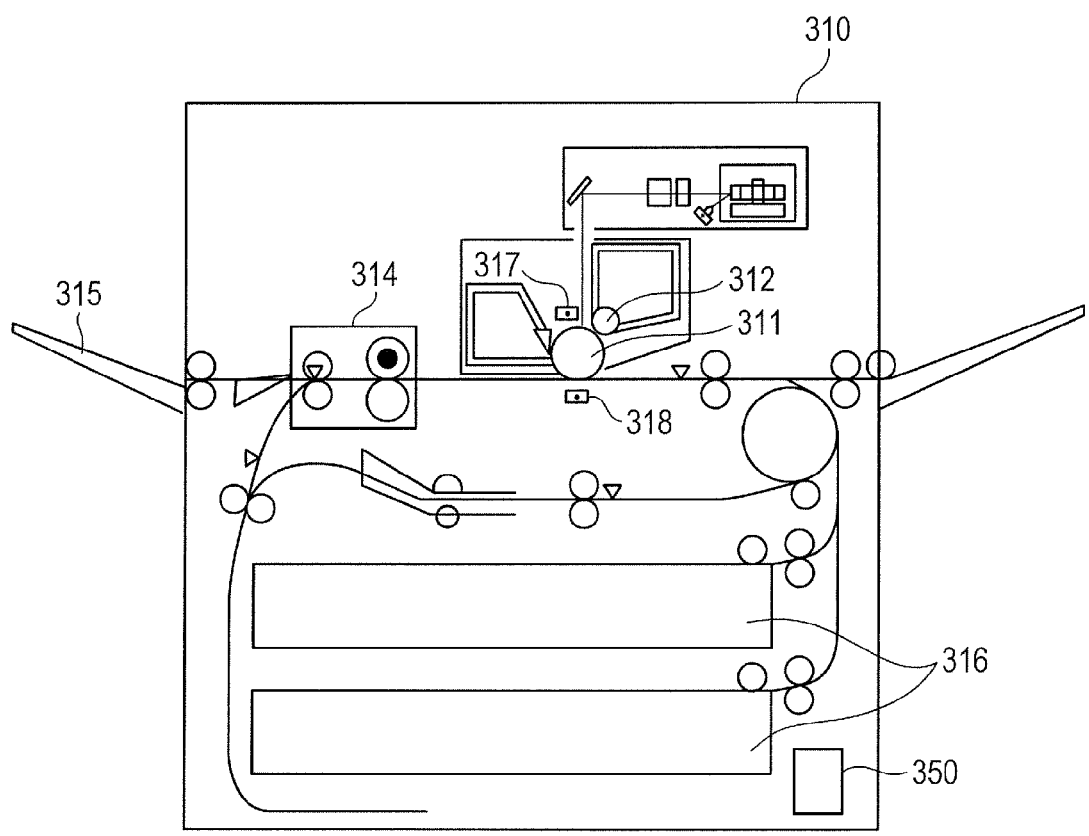
FIG. 8 is a schematic diagram of an image forming apparatus according to a fourth embodiment of the present invention.

A laser beam printer is described as an example of the image forming apparatus. FIG. 8 illustrates a schematic structure of the laser beam printer as an example of an electrophotographic printer. A laser beam printer 310 includes a photosensitive drum 311 as an image bearing member on which an electrostatic latent image is to be formed, a charging unit 317 for uniformly charging the photosensitive drum 311, and a developing unit 312 for developing the electrostatic latent image formed on the photosensitive drum 311 with toner. A toner image developed on the photosensitive drum 311 is transferred by a transfer unit 318 onto a sheet (not shown) as a recording material supplied from a cassette 316. The toner image transferred onto the sheet is fixed by a fixing unit 314 and is discharged to a tray 315. The photosensitive drum 311, the charging unit 317, the developing unit 312, and the transfer unit 318 correspond to an image forming unit. The laser beam printer 310 further includes a power supply apparatus 350 described in the first to third embodiments. Note that, the image forming apparatus to which the power supply apparatus according to the first to third embodiments is applicable is not limited to the one exemplified in FIG. 8. For example, the image forming apparatus may include multiple image forming units. Further, the image forming apparatus may include a primary transfer unit for transferring the toner image formed on the photosensitive drum 311 onto an intermediate transfer belt, and a secondary transfer unit for transferring the toner image formed on the intermediate transfer belt onto a sheet.

The laser beam printer 310 includes a controller (not shown) for controlling an image forming operation of the image forming unit and a sheet conveyance operation. The power supply apparatus according to the first to third embodiments supplies power to, for example, the controller. Further, the power supply apparatus according to the first to third embodiments supplies power also to a driving unit such as a motor for rotating the photosensitive drum 311 or driving various kinds of rollers for conveying a sheet. The image forming apparatus of this embodiment can reduce load and power consumption by supplying power only to, for example, the controller in the standby state (for example, in the sleep mode) for realizing power saving.

As described above, according to this embodiment, it is possible to perform the resettable protection in which the overvoltage protection is activated when an abnormality of the input voltage is detected, and afterward is reset. In addition, power consumption in the standby state can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-006421, filed Jan. 17, 2013, which is hereby incorporated by reference herein in its entirety.

What is claimed is:

1. A power supply apparatus comprising:
a first power supply configured to convert an input AC voltage into a first voltage, and output the first voltage;
a second power supply configured to convert the input AC voltage into a second voltage, and output the second voltage;
a switch configured to switch between a voltage supply state in which the input AC voltage is supplied to the second power supply and a voltage cut-off state in which the input AC voltage is not supplied to the second power supply;
a state-switching unit configured to switch a state of the switch between the voltage supply state and the voltage cut-off state according to a variation of the first voltage output from the first power supply; and
a detection unit configured to detect the input AC voltage,
wherein the first power supply is configured to cause decrease of the first voltage in a case where a value of the input AC voltage detected by the detection unit is equal to or more than a predetermined value, and
wherein the state-switching unit is configured to switch a state of the switch from the voltage supply state to the voltage cut-off state according to the decrease of the first voltage.

2. A power supply apparatus according to claim 1, wherein the detection unit configured to detect a voltage in which the input AC voltage supplied to the first power supply is rectified.

3. A power supply apparatus according to claim 1, wherein the state-switching unit is a photo-coupler connected to the switch.

4. A power supply apparatus according to claim 1, wherein the state-switching unit is configured to switch a state of the switch from the voltage supply state to the voltage cut-off state according to an external signal received from outside the power supply apparatus.

5. A power supply apparatus according to claim 1, wherein the switching of the state of the switch causes in a case of power saving state.

6. A power supply apparatus according to claim 1, wherein the first power supply comprising a transformer and a control unit configured drive the transformer,
wherein the control unit is configured to control to stop driving of the transformer according to variation of the first voltage.

7. An image forming apparatus comprising:
an image forming unit configured to form an image;
a power supply apparatus for supplying a power that is necessary to form the image, the power supply apparatus comprising:
a first power supply configured to convert an input AC voltage into a first voltage, and output the first voltage;
a second power supply configured to convert the input AC voltage into a second voltage, and output the second voltage;
a switch configured to switch between a voltage supply state in which the input AC voltage is supplied to the second power supply and a voltage cut-off state in which the input AC voltage is not supplied to the second power supply;
a state-switching unit configured to switch a state of the switch between the voltage supply state and the voltage cut-off state according to a variation of the first voltage output from the first power supply; and
a detection unit configured to detect the input AC voltage,
wherein the first power supply is configured to cause decrease of the first voltage in a case where a value of the input AC voltage detected by the detection unit is equal to or more than a predetermined value, and
wherein the state-switching unit is configured to switch a state of the switch from the voltage supply state to the voltage cut-off state according to the decrease of the first voltage.

8. An image forming apparatus according to claim 7, wherein the detection unit configured to detect a voltage in which the input AC voltage supplied to the first power supply is rectified.

9. An image forming apparatus according to claim 7, wherein the state-switching unit is a photo-coupler connected to the switch.

10. An image forming apparatus according to claim 7, wherein the state-switching unit is configured to switch a state of the switch from the voltage supply state to the voltage cut-off state according to an external signal received from outside the power supply apparatus.

11. An image forming apparatus according to claim 10, wherein the switching of the state of the switch causes in a case of power saving state.

12. An image forming apparatus according to claim 7, wherein the first power supply comprising a transformer and a control unit configured drive the transformer,
wherein the control unit is configured to control to stop driving of the transformer according to variation of the first voltage.

13. An image forming apparatus according to claim 7, further comprising a controller configured to control the image forming unit; and
a driving unit configured to drive the image forming unit,
wherein the first power supply supplies a power to the controller and the second power supply supplies a power to the driving unit.

14. A power supply apparatus comprising:
a first power supply configured to convert an input AC voltage into a first voltage, and output the first voltage;
a second power supply configured to convert the input AC voltage into a second voltage, and output the second voltage;
a switch configured to switch between a voltage supply state in which the input AC voltage is supplied to the second power supply and a voltage cut-off state in which the input AC voltage is not supplied to the second power supply,
wherein in a case where the input AC voltage is a predetermined voltage or more, the first power supply reduces the first voltage, and
wherein a state of the switch switches from the voltage supply state to the voltage cut-off state according to reduction of the first voltage.

15. The power supply according to claim 14,
wherein the second power supply stops an operation to reduce the second voltage in a case where the input AC voltage is a predetermined voltage or more.

16. An image forming apparatus comprising:
an image forming unit configured to form an image; and
a power supply apparatus for supplying a power that is necessary to form an image, the power supply apparatus comprising:
a first power supply configured to convert an input AC voltage into a first voltage, and output the first voltage;

a second power supply configured to convert the input AC voltage into a second voltage, and output the second voltage;

a switch configured to switch between a voltage supply state in which the input AC voltage is supplied to the second power supply and a voltage cut-off state in which the input AC voltage is not supplied to the second power supply, wherein in a case where the input AC voltage is a predetermined voltage or more, the first power supply reduces the first voltage, and wherein a state of the switch switches from the voltage supply state to the voltage cut-off state according to reduction of the first voltage.

17. An image forming apparatus according to claim 16, wherein the second power supply stops an operation to reduce the second voltage in a case where the input AC voltage is a predetermined voltage or more.

18. An image forming apparatus according to claim 17, further comprising a controller configured to control the image forming unit; and a driving unit configured to drive the image forming unit, wherein the first power supply supplies a power to the controller and the second power supply supplies a power to the driving unit.

* * * * *